(12) United States Patent
Elshafie et al.

(10) Patent No.: US 11,563,473 B2
(45) Date of Patent: Jan. 24, 2023

(54) LOG LIKELIHOOD RATIO BASED RATE ADAPTATION THROUGH TURBO-HARQ

(71) Applicant: QUALCOMM Incorporated, San Diego, CA (US)

(72) Inventors: Ahmed Elshafie, San Diego, CA (US); Mahdi Zamani, San Diego, CA (US); Yi Huang, San Diego, CA (US); Peter Gaal, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/313,918

(22) Filed: May 6, 2021

(65) Prior Publication Data

US 2021/0351821 A1 Nov. 11, 2021

Related U.S. Application Data

(60) Provisional application No. 63/021,603, filed on May 7, 2020.

(51) Int. Cl.
*H04B 7/0456* (2017.01)
*H04L 1/00* (2006.01)
*H04B 17/336* (2015.01)
*H04L 43/0823* (2022.01)

(52) U.S. Cl.
CPC ......... *H04B 7/0486* (2013.01); *H04B 17/336* (2015.01); *H04L 1/0054* (2013.01); *H04L 43/0847* (2013.01)

(58) Field of Classification Search
CPC ... H04B 7/0486; H04B 17/336; H04L 1/0054; H04L 43/0847
See application file for complete search history.

(56) References Cited

U.S. PATENT DOCUMENTS

| 8,797,889 B2 * | 8/2014 | Parkvall | H04L 1/0026 370/252 |
|---|---|---|---|
| 9,209,940 B2 * | 12/2015 | Kim | H04L 1/1887 |
| 2006/0276212 A1 * | 12/2006 | Sampath | H04L 25/03242 455/513 |
| 2007/0010957 A1 * | 1/2007 | Sampath | H04B 1/1027 702/57 |
| 2012/0069768 A1 * | 3/2012 | Ghassemzadeh | H04B 7/0602 370/252 |

(Continued)

*Primary Examiner* — Jaison Joseph
(74) *Attorney, Agent, or Firm* — Holland & Hart LLP

(57) ABSTRACT

Methods, systems, and devices for wireless communications are described. A method of wireless communication at a user equipment (UE) is described that may include receiving a data packet transmission over a wireless channel from a base station. The method may further include determining a set of intrinsic log likelihood ratios (LLRs) based at least in part on the data packet transmission and determining an accumulated capacity for the wireless channel based at least in part on the set of intrinsic LLRs. The method may also include determining a channel quality indicator index or a transmission rank for the wireless channel based at least in part on the accumulated capacity and transmitting a feedback message that indicates the channel quality indicator index or the transmission rank for the wireless channel to the base station.

30 Claims, 15 Drawing Sheets

(56) References Cited

U.S. PATENT DOCUMENTS

| | | | |
|---|---|---|---|
| 2015/0029952 A1* | 1/2015 | Huang | H04L 1/1812 |
| | | | 370/329 |
| 2015/0229370 A1* | 8/2015 | Lidian | H04L 1/1861 |
| | | | 370/335 |
| 2018/0097607 A1* | 4/2018 | Ji | H04W 72/046 |
| 2019/0312682 A1* | 10/2019 | Nammi | H04W 72/12 |
| 2020/0112357 A1* | 4/2020 | Fakoorian | H04L 1/0009 |
| 2021/0351821 A1* | 11/2021 | Elshafie | H04L 43/0847 |

\* cited by examiner

LOG LIKELIHOOD RATIO BASED RATE ADAPTATION THROUGH TURBO-HARQ

CROSS REFERENCE

The present application for patent claims the benefit of U.S. Provisional Patent Application No. 63/021,603 by ELSHAFIE et al., entitled "LOG LIKELIHOOD RATIO BASED RATE ADAPTATION THROUGH TURBO-HARQ," filed May 7, 2020, assigned to the assignee hereof, and expressly incorporated by reference herein.

FIELD OF TECHNOLOGY

The following relates generally to wireless communications and more specifically to log likelihood ratio (LLR)-based rate adaptation through turbo hybrid automatic repeat request (HARQ).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support log likelihood ratio based rate adaptation through Turbo-HARQ. Generally, the described techniques provide for improving a block error rate (BLER) within two HARQ transmissions. When a UE determines that there is a decoding error for a received data packet transmission, the UE can make some calculations that indicates conditions for the wireless channel between the UE and the transmitting device, such as a base station. The UE may provide feedback information related to the wireless channel conditions to the base station in a Turbo-HARQ feedback message. The feedback information may include a CQI index or a transmission rank. Techniques for determining the feedback information are described.

A method of wireless communication at a UE is described. The method may include receiving a data packet transmission over a wireless channel from a base station and determining a set of intrinsic LLRs based on the data packet transmission. The method may further include determining an accumulated capacity for the wireless channel based on the set of intrinsic LLRs and determining a channel quality indicator index or a transmission rank for the wireless channel based on the accumulated capacity. The method may also include transmitting a feedback message that indicates the CQI index or the transmission rank for the wireless channel to the base station.

An apparatus for wireless communication at a UE is described. The apparatus may include a processor, memory coupled with the processor, and instructions stored in the memory. The instructions may be executable by the processor to cause the apparatus to receive a data packet transmission over a wireless channel from a base station and determine a set of intrinsic LLRs based on the data packet transmission. The instructions may be further executable by the processor to cause the apparatus to determine an accumulated capacity for the wireless channel based on the set of intrinsic LLRs and determine a channel quality indicator index or a transmission rank for the wireless channel based on the accumulated capacity. The instructions may be executable by the processor to cause the apparatus to transmit a feedback message that indicates the channel quality indicator index or the transmission rank for the wireless channel to the base station.

Another apparatus for wireless communication at a UE is described. The apparatus may include means for receiving a data packet transmission over a wireless channel from a base station and means for determining a set of intrinsic LLRs based on the data packet transmission. The apparatus may further include means for determining an accumulated capacity for the wireless channel based on the set of intrinsic LLRs and means for determining a channel quality indicator index or a transmission rank for the wireless channel based on the accumulated capacity. The apparatus may further include means for transmitting a feedback message that indicates the channel quality indicator index or the transmission rank for the wireless channel to the base station.

A non-transitory computer-readable medium storing code for wireless communication at a UE is described. The code may include instructions executable by a processor to receive a data packet transmission over a wireless channel from a base station, determine a set of intrinsic LLRs based on the data packet transmission, and determine an accumulated capacity for the wireless channel based on the set of intrinsic LLRs. The code may further include instructions executable by a processor to determine a channel quality indicator index or a transmission rank for the wireless channel based on the accumulated capacity and transmit a feedback message that indicates the channel quality indicator index or the transmission rank for the wireless channel to the base station.

Some examples of the method, apparatuses, and non-transitory computer-readable medium described herein may further include operations, features, means, or instructions for decoding the data packet transmission, and determining a set of decoder output LLRs based on the decoded data packet transmission.

Some examples of the method, apparatuses, and non-transitory computer-readable medium described herein may further include operations, features, means, or instructions for determining a SNR for the data packet transmission based on the set of intrinsic LLRs and the set of decoder output LLRs, where determining the accumulated capacity may be further based on the SNR.

In some examples of the method, apparatuses, and non-transitory computer-readable medium described herein, determining the SINR further may include operations, features, means, or instructions for comparing the set of intrinsic LLRs to the set of decoder output LLRs, and computing a BER based on the comparison, where the SNR may be further based on the BER.

In some examples of the method, apparatuses, and non-transitory computer-readable medium described herein, comparing the set of intrinsic LLRs to the set of decoder output LLRs further may include operations, features, means, or instructions for differing a bit string of the set of intrinsic LLRs and a bit string of the set of decoder output LLRs.

Some examples of the method, apparatuses, and non-transitory computer-readable medium described herein may further include operations, features, means, or instructions for determining the SNR for the data packet may be further based on a quadrature amplitude modulation of the data packet transmission.

Some examples of the method, apparatuses, and non-transitory computer-readable medium described herein may further include operations, features, means, or instructions for determining a spectral efficiency of the wireless channel from the SNR, where the accumulated capacity may be the spectral efficiency.

In some examples of the method, apparatuses, and non-transitory computer-readable medium described herein, determining the spectral efficiency further may include operations, features, means, or instructions for computing an average spectral efficiency based on a minimum of a maximum modulation order and a log based on the SNR.

In some examples of the method, apparatuses, and non-transitory computer-readable medium described herein, determining the spectral efficiency further may include operations, features, means, or instructions for determining the SNR as an SNR per transmission layer of the data packet transmission, and computing an average spectral efficiency based on a sum of a minimum of a log based on the SNR per transmission layer and a maximum modulation order.

Some examples of the method, apparatuses, and non-transitory computer-readable medium described herein may further include operations, features, means, or instructions for decoding the data packet transmission, and detecting at least one decoding error in the decoded data packet transmission, where determining the set of intrinsic LLRs may be based on detecting the at least one decoding error.

In some examples of the method, apparatuses, and non-transitory computer-readable medium described herein, determining the CQI index for the wireless channel further may include operations, features, means, or instructions for determining the CQI index using the spectral efficiency and a CQI-to-efficiency table.

Some examples of the method, apparatuses, and non-transitory computer-readable medium described herein may further include operations, features, means, or instructions for determining the transmission rank of the wireless channel based on a number of transmission layers of the data packet transmission.

A method of wireless communication at a base station is described. The method may include transmitting a data packet transmission over a wireless channel to a UE and receiving a feedback message that indicates a channel quality indicator index or a transmission rank for the wireless channel from the UE. The method may further include updating a transmission parameter based on the channel quality indicator index or the transmission rank and retransmitting at least a portion of the data packet transmission over the wireless channel using the updated transmission parameter.

An apparatus for wireless communication at a base station is described. The apparatus may include a processor, memory coupled with the processor, and instructions stored in the memory. The instructions may be executable by the processor to cause the apparatus to transmit a data packet transmission over a wireless channel to a UE and receive a feedback message that indicates a channel quality indicator index or a transmission rank for the wireless channel from the UE. The instructions may be executable by the processor to update a transmission parameter based on the channel quality indicator index or the transmission rank, and retransmit at least a portion of the data packet transmission over the wireless channel using the updated transmission parameter.

Another apparatus for wireless communication at a base station is described. The apparatus may include means for transmitting a data packet transmission over a wireless channel to a UE and means for receiving a feedback message that indicates a channel quality indicator index or a transmission rank for the wireless channel from the UE. The apparatus may also include means for updating a transmission parameter based on the channel quality indicator index or the transmission rank and means for retransmitting at least a portion of the data packet transmission over the wireless channel using the updated transmission parameter.

A non-transitory computer-readable medium storing code for wireless communication at a base station is described. The code may include instructions executable by a processor to transmit a data packet transmission over a wireless channel to a UE and receive a feedback message that indicates a channel quality indicator index or a transmission rank for the wireless channel from the UE. The code may include instructions executable by a processor to update a transmission parameter based on the channel quality indicator index or the transmission rank and retransmit at least a portion of the data packet transmission over the wireless channel using the updated transmission parameter.

In some examples of the method, apparatuses, and non-transitory computer-readable medium described herein, updating the transmission parameter further may include operations, features, means, or instructions for updating a modulation and coding scheme based on the channel quality indicator index.

In some examples of the method, apparatuses, and non-transitory computer-readable medium described herein, updating the transmission parameter further may include operations, features, means, or instructions for updating a coding length for retransmitting the data packet based on the channel quality indicator index or the transmission rank.

In some examples of the method, apparatuses, and non-transitory computer-readable medium described herein, updating the transmission parameter further may include operations, features, means, or instructions for updating resources used for retransmitting the data packet based on the channel quality indicator index or the transmission rank.

DETAILED DESCRIPTION

Figure 1:
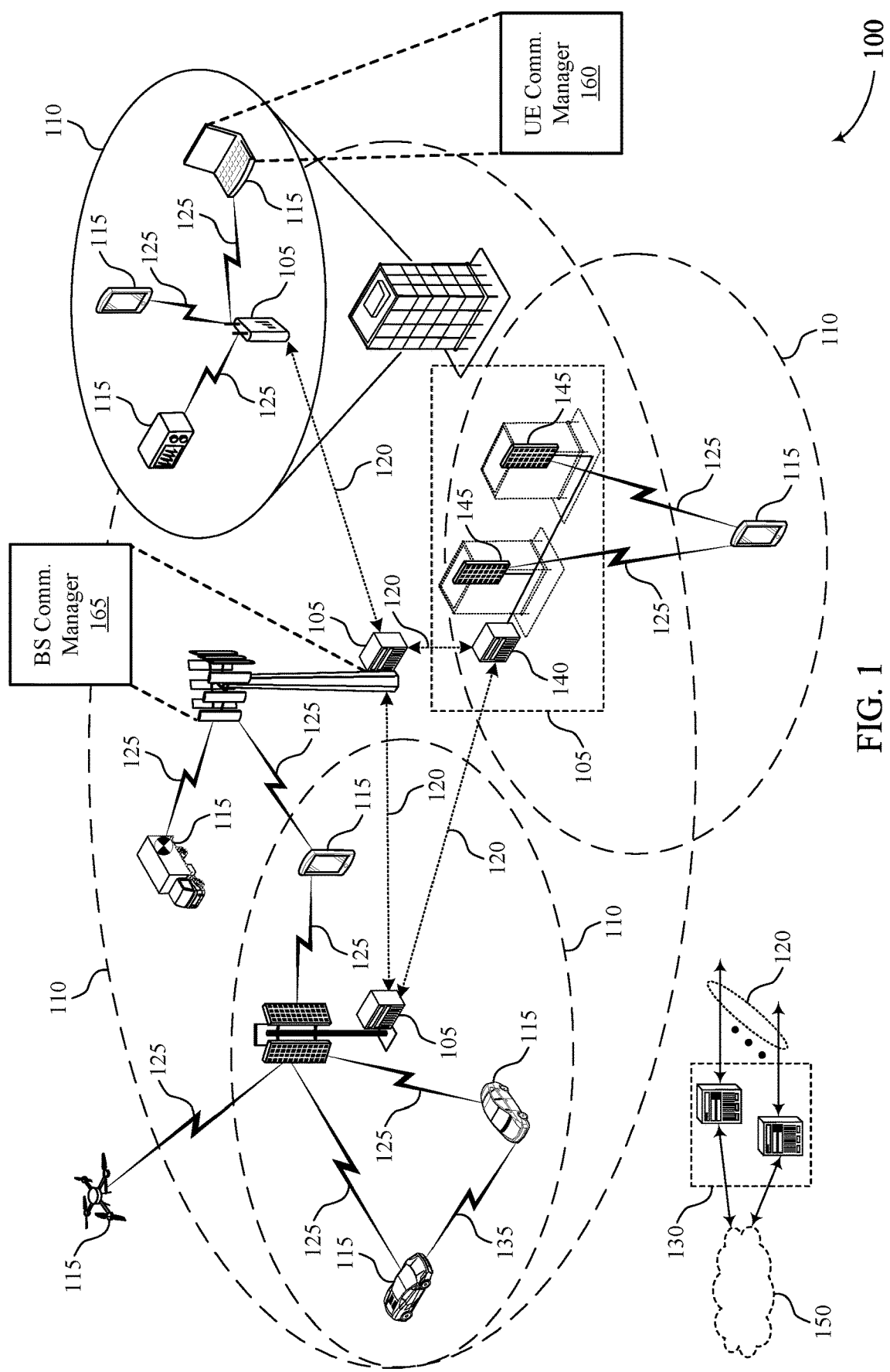
FIG. 1 illustrates an example of a system for wireless communications that supports LLR-based rate adaptation through Turbo-HARQ in accordance with aspects of the present disclosure.

A wireless communications system may support turbo hybrid automatic repeat requests (HARQ) with acknowledgement/negative acknowledgement (AKC/NACK) and channel state information (CSI) feedback. In Turbo HARQ, the UE may send feedback regarding the conditions of the wireless channel to the base station. The base station may use the feedback to change one or more transmission parameters to reduce error over the wireless channel. However, sometimes the feedback may be slow or require several transmissions to determine, which may be unsuitable for some applications such as ultra reliability communications. Techniques described herein provide a residual block error rate of less than $1 \times 10^{-4}$ within two HARQ transmissions.

To improve the residual BLER, a UE will determine a channel quality indicator (CQI) index using log likelihood ratios when a data packet transmission is received with errors. The UE sends the CQI index to the base station, which uses the CQI index to update a transmission parameter, such as a modulation and coding scheme (MCS), for a retransmission of the data packet. The UE can also send a transmission rank (e.g., a number of transmission layers) to the base station. The base station may use the transmission rank to update a transmission parameter for the retransmission of the data packet and for future transmissions.

The UE may calculate the CQI index based on the signal-to-noise ratio (SNR) per transmission layer. The SNR may be used to determine an average spectral efficiency (SPEF) (e.g., accumulated capacity) of the wireless channel. The UE may use an assigned CQI table to determine the CQI index based on the SPEF. The CQI index may be transmitted to the base station in a feedback message. The rank or number of transmission layers may also be indicated to the base station.

The SNR may be calculated using a BER determined from a difference between intrinsic LLRs and decoder output LLRs. The intrinsic LLRs are determined before the data packet is decoded, while the decoder output LLRs are determined from the decoded data packet. The resultant bit streams are then compared (i.e., differenced). Any non-zero bits in the subtraction may represent errors in the received data packet. The UE may calculate the BER by dividing the number of non-zero bits by the total number of bits of the data packet. Because the BER after the decoder is negligible and can be assumed to be zero, the number of non-zero bits may represent the effect of the channel on the data packet. From the BER, the CQI index and the number of transmission layers may be determined.

Techniques described herein provide two methods for calculating the average SPEF. For example, the average SPEF may be calculated as a minimum between a log function of the average SNR (y*) and the maximum modulation order ($Q_{max}$), given as min ($\log_2(1+y^*)$, $Q_{max}$). Alternatively, the UE may calculate the average SPEF per transmission layer, L, based on the SNR per layer ($y_1^*$), which is given as $$\frac{\sum_{l \in \{1,\ldots,l\}} \min(\log_2(1 + y_l^*), Q_{max})}{L}.$$

In some examples, the UE may send a transmission rank to the base station. For example, if the SPEF of any subset of transmission layers is higher than using a maximum number of transmission layers, the UE may report a new transmission rank to the base station. The base station may adapt its transmission rate accordingly.

The described techniques may improve configurations of MCS, reduce bit error rates, improve efficiencies, improve coding rates, decrease system latency, and improve user experience.

Aspects of the disclosure are initially described in the context of wireless communications systems. Aspects of the disclosure are further illustrated by and described with reference to a swim diagram, a block diagram, and a flowchart. Aspects of the disclosure are further illustrated by and described with reference to apparatus diagrams, system diagrams, and flowcharts that relate to log likelihood ratio based rate adaptation through Turbo-HARQ.

FIG. 1 illustrates an example of a wireless communications system 100 that supports LLR-based rate adaptation through Turbo-HARQ in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1-MME/S1-U interface, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In RLC applications, data transmissions may need to be as quick as possible with the least number of retransmissions. In Turbo-HARQ, a UE provides feedback to the transmitting base station for the base station to change the modulation parameters, MCS, or the modulation order for a subsequent retransmission. Typically, a first transmission may have a BLER of 10%. Techniques described herein provide reduced BLERs, such as a BLER of less than $10^{-4}$ within two transmissions. Techniques described herein may increase the likelihood that the second transmission of a data packet will be successful.

In FIG. 1, a UE 115 includes a UE communications manager 160. The UE communications manager 160 may perform techniques described herein related to providing feedback in Turbo-HARQ. The UE communications manager 160 may try to compute or to use a data packet transmission to compute some CSI or CQI to be sent to a base station 105. The base station 105 may change one or more modulation parameters in order to enhance the transmission layers or encode the BER so that the second transmissions should succeed with no error. The UE communications manager 160 may obtain a small BLER within two transmissions per transmit block.

In some examples, the UE communications manager 160 may receiving a data packet transmission over a wireless channel from a base station and determine a set of intrinsic LLRs based at least in part on the data packet transmission. The UE communications manager 160 may determine an accumulated capacity for the wireless channel based at least in part on the set of intrinsic LLRs and determine a CQI index or a transmission rank for the wireless channel based at least in part on the accumulated capacity. The UE communications manager 160 may transmit a feedback message that indicates the CQI index or the transmission rank for the wireless channel to the base station.

A base station 105 may include a base station communications manager 165. The base station communications manager 165 may perform techniques described herein related to providing feedback in Turbo-HARQ. The base station communications manager 165 may receive feedback information from the UE 115 regarding a data packet transmission. The feedback information may include, for example, an acknowledgement (ACK), a negative acknowledgement (NACK), a CQI index, or a transmission rank. The base station communications manager 165 may update one or more transmission parameters, such as an MCS rate, based on the received feedback. Then the base station 105 may retransmit the packet.

In some examples, the base station communications manager 165 may transmit a data packet transmission over a wireless channel to a UE and receive a feedback message that indicates a CQI index or a transmission rank for the wireless channel from the UE. The base station communications manager 165 may update or modify a transmission parameter based on the CQI index or the transmission rank. The base station communications manager 165 may retransmit at least a portion of the data packet transmission over the wireless channel using the updated transmission parameter.

The described techniques may improve configurations of MCS, reduce bit error rates, improve efficiencies, improve coding rates, decrease system latency, and improve user experience. The described techniques may improve functioning for ultra-reliability communications. Further, the described techniques may improve the functioning of the physical layer in wireless communications.

Figure 2:
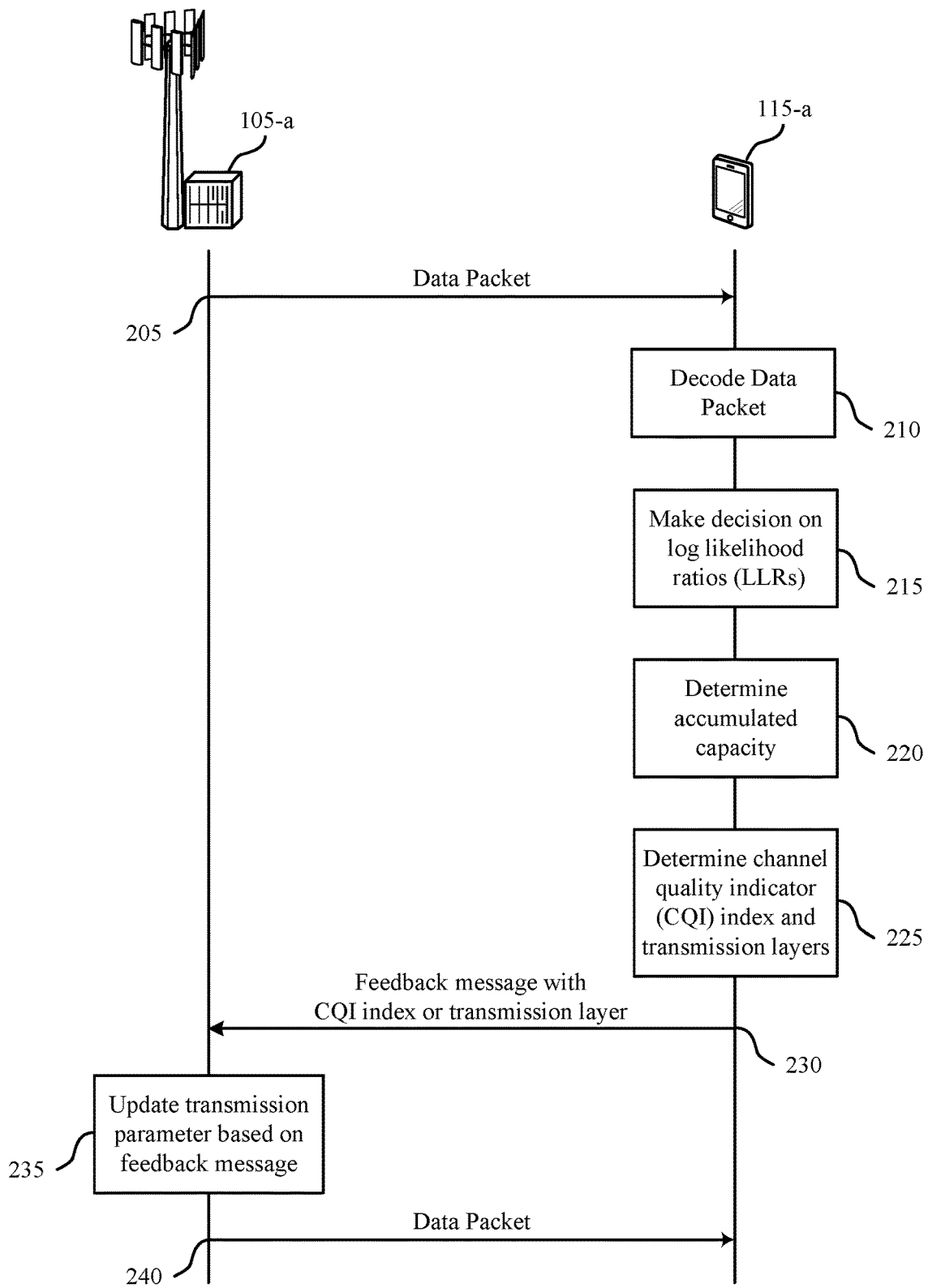
FIG. 2 shows a swim diagram of a wireless communication system illustrating example operations that support LLR-based rate adaptation through Turbo-HARQ in accordance with aspects of the present disclosure.

FIG. 2 shows a swim diagram of a wireless communication system 200 illustrating example operations that support LLR-based rate adaptation through Turbo-HARQ in accordance with aspects of the present disclosure. The wireless communication system 200 may include a base station 105-*a* and a UE 115-*a*. In some examples, the wireless communication system 200 may implement aspects of wireless communication system 100, the base station 105-*a* may be an example of aspects of a base station 105, and the UE 115-*a* may be an example of aspects of a UE 115.

At 205, the base station 105-*a* may transmit a data packet to the UE 115-*a*. The data packet may be any sort of wireless transmission packet sent over a wireless channel. At 210, the UE 115-*a* may decode the data packet using a decoder. The UE 115-*a* may determine that there are one or more decoding errors with the data packet, which may show that the wireless channel may have caused errors to the data packet. For example, the wireless channel may be poor due to interference, multi-path, weather conditions, or the like. In some examples, the UE 115-*a* may perform the described techniques wherever a decoding error is detected. In other examples, the UE 115-*a* may perform the described techniques only when a threshold number of errors is found in the decoded data packet.

At 215, the UE 115-*a* may make a decision on the LLRs of the data packet. The LLRs of the data packet may include intrinsic LLRs determined before the data packet is decoded and decoder output LLRs determined after the data packet is decoded. An LLR may be a probability that a given bit is a 0 or a 1. Before the data packet is decoded, each bit of the data packet may be predicted to be a 0 or a 1. The set of these predictions may be referred to as a set of intrinsic LLRs. The set of intrinsic LLRs may be input to the decoder.

Once the data packet is decoded, each bit of the decoded data packet may be predicted to be a 0 or a 1. The set of these predictions may be referred to as a set of decoder output LLRs. The decoder output LLRs may be hard-decisioned, and these bits may be the ones corresponding to the data packet or the codeword transmitted. Since the decoder has a very low probability of error, it can be presumed that any errors in the decoded data packet may be attributed to errors caused by the wireless channel. Hard decision decoding may take a stream of LLRs or a block of LLRs from a receiver and decode each bit by considering it as definitely a 1 or a 0.

At 215, the decision may include subtracting the set of hard-decisioned bits obtained from the intrinsic LLRs from the set of hard-decisioned bits obtained from the decoder output LLRs. Any value of 1 may represent an error in the decoded data packet. The UE may calculate a bit error rate from the difference. The bit error rate may be used to determine an average SNR across all layers or an SNR per layer.

At 220, the UE 115-*a* may determine an accumulated capacity, or spectral efficiency. The spectral efficiency may be determined based on an average over all of the transmission layers or may be determined per transmission layer. The spectral efficiency may be calculated using the SNR that was found from the bit error rate.

At 225, the UE 115-*a* may determine a CQI index and a number of transmission layers. The CQI index may be determined using the spectral efficiency. The UE 115-*a* may determine the CQI index using a CQI table that maps CQI indexes to spectral efficiencies. Table 1 and Table 2 both provide example CQI tables that may be used. The tables may be selected based on the number of bits or a maximum quadrature amplitude modulation (QAM). Both Tables 1 and 2 are 4-bit QCI tables. In other examples, other tables may be used. The efficiency listed in the tables corresponds to the SPEF as described herein.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

At 230, the UE 115-*a* may return feedback to the base station 105-*a*. The feedback message may include indications of one or more of a QCI index, a number of transmission layers, a transmission rank, or combinations thereof. In some examples, the feedback message includes an indication of the CQI index. In other examples, the feedback message includes an indication of the CQI index and the transmission rank. In other examples, the feedback message includes an indication of the transmission rank or layers. The feedback message may also include an ACK or a NACK.

The base station 105-*a* may receive the feedback message and determine the CQI index or transmission rank from the feedback message. At 235, the base station 105-*a* may update one or more transmission parameters based on the feedback message. For example, the base station 105-*a* may adjust an MCS or a number of transmission layers used for a retransmission of the data packet, or for subsequent transmissions of other data packets. The base station 105-*a* may retransmit the data packet to the UE 115-*a* at 240.

Techniques described herein may leverage Turbo-HARQ to improve fidelity and reduce data errors. The BLER may be reduced to less than $10^{-4}$ using the techniques described herein.

Figure 3:
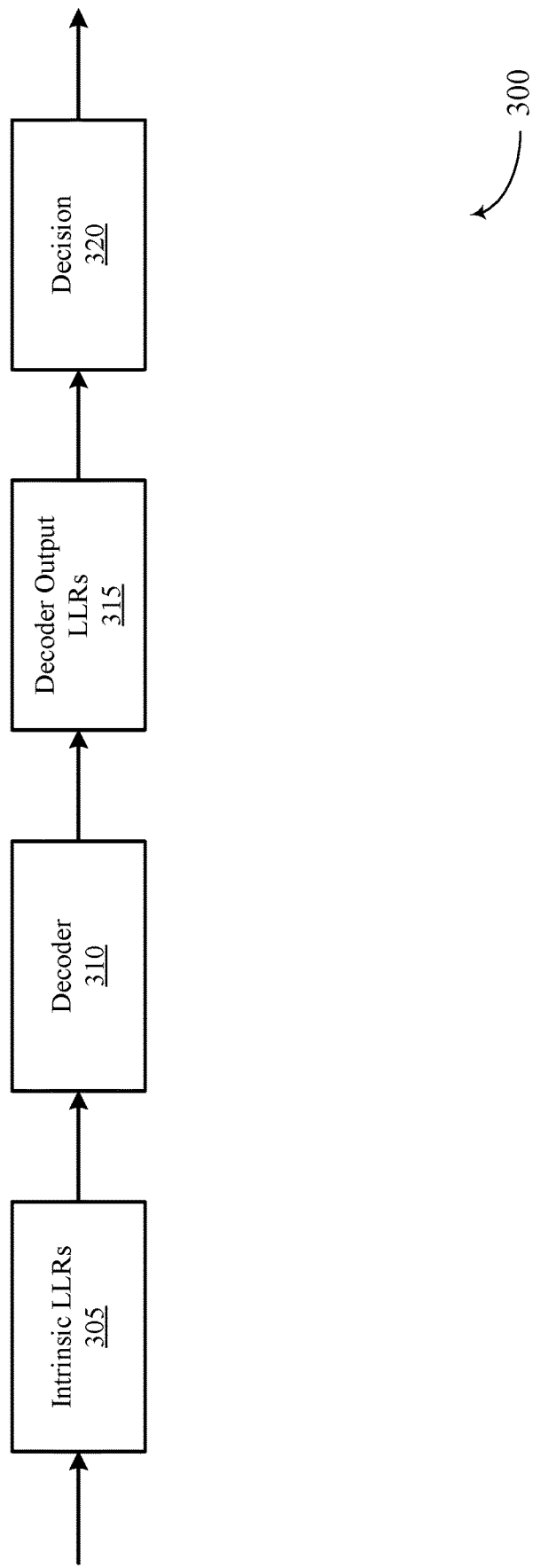
FIG. 3 shows a diagram for determining a bit error rate (BER) in accordance with aspects of the present disclosure.

FIG. 3 shows a diagram 300 for determining a BER in accordance with aspects of the present disclosure. In some examples, the diagram 300 may implement aspects of wireless communication system 100. The diagram 300 may be incorporated into a UE, such as a UE 115 as described herein. The diagram 300 may include an intrinsic LLR 305, a decoder 310, a decoder output LLR 315, and a decision 320. The decoder 310 may be an example of aspects of a decoder 735. The intrinsic LLR 305, decoder 310, decoder output LLR 315, and decision 320 may be implemented by a processor in a UE.

The intrinsic LLR 305 may represent a set of intrinsic LLRs generated from an incoming data packet. The set of intrinsic LLRs may be determined based on a probability of each bit of the data packet being a 1 or a 0. Any error in the wireless channel over which the data packet was transmitted may be reflected in the set of intrinsic LLRs. The set of intrinsic LLRs is input into the decoder 310. The set of intrinsic LLRs may be an array.

The decoder 310 may employ various decoding algorithms to decode the data packet, or the set of intrinsic LLRs. The decoded data packet may also be the set of decoder output LLRs, represented by decoder output LLR 315. Decision 320 may subtract the set of intrinsic LLRs from the set of decoder output LLRs. That is, decision 320 may differ the resultant hard-decisioned bit strings. Any bit greater than 0 may indicate an error. The difference may represent error caused by the wireless channel.

Consider a 4-bit data packet as an example. The intrinsic LLR 305 may determine a set of intrinsic LLRs from the 4-bit data block. After applying the intrinsic LLR 305 to the 4-bit data block, a set of intrinsic LLRs may be obtained. In this example, the set of intrinsic LLRs may be hard-decisioned to {1, 1, 0, 0}. This set of intrinsic LLRs may be sent as input to the decoder 310, which may output {0, 1, 0, 1}. The output is a hard decision on the set of decoder output LLRs. The decision 320 may differ (or take the exclusive-or (XOR) between) the hard decision on the set of intrinsic LLRs and the hard decision on the set of decoder output LLRs, which gives {1, 0, 0, 1}. In this example, two of the bits have a different value greater than 0, that is, the two of value 1. So there are two bits in error. Because the rate of error of decoder 310 is very small, the two bits in error can be attributed to error caused by the wireless channel. That is, an assumption may be made that the decoder 310 is error-free because the error rate is negligible.

The bit error rate can be calculated from the difference. The BER can be given as the number of bits in error divided by the total number of bits. In this example, 2 bits in error divided by 4 total bits gives a BER of 0.5. A block of 1000 bits with 1 bit in error has a BER of $10^{-3}$, however, the entire block may be considered to be in error and may be retransmitted in future transmission times. Even one bit of error can cause a large BLER error. Techniques described herein may reduce the BLER through configuring the retransmission parameters.

Techniques described herein may use the BER to determine the SNR, since the BER is related to the input SNR. After the SNR is determined, the UE may determine the SPEF.

Figure 4:
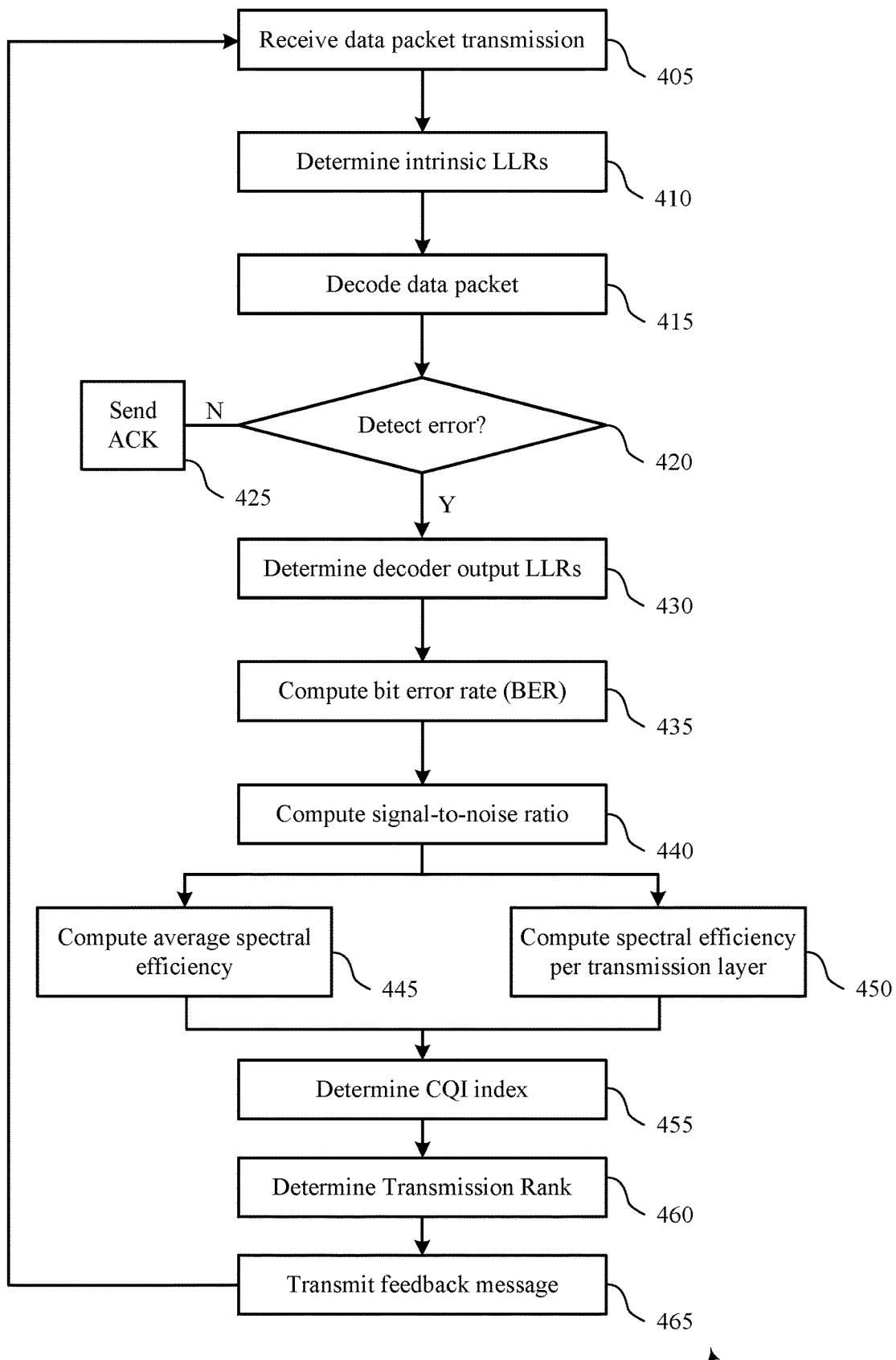
FIG. 4 shows a flowchart for a method of determining a channel quality indicator (CQI) index and a transmission layer in accordance with aspects of the present disclosure.

FIG. 4 shows a flowchart for a method 400 of determining a CQI index and a transmission layer in accordance with aspects of the present disclosure. In some examples, method 400 may implement aspects of wireless communication system 100. For example, method 400 may be implemented by a UE 115 as described herein.

At 405, the UE may receive a data packet transmission from a transmitting device. At 410, the UE may determine a set of intrinsic LLRs. The UE may input the set of intrinsic LLRs to a decoder, and method 400 may include decoding the set of intrinsic LLRs or the data packet at 415. At 420, the UE may determine if an error is present in the decoded packet. If not, method 400 may proceed to 425. At 425, the UE may send an acknowledgement (ACK) to the transmitting device.

If an error is detected, method 400 may proceed to 430, where a set of decoder output LLRs are determined, which may be the same as the decoded packet. At 435, the BER is computed. The BER is determined by differencing (or using XOR) the set of hard-decisioned intrinsic LLRs and the set of hard-decisioned decoder output LLRs. The computed average bit-error-rate may be given as $P_e$. In some examples, the BER may be computed per transmission layer, t, where the BER per layer is given as $P_e^l$, where $l \in \{1, 2, \ldots, L\}$, and L is the number of transmission layers.

At 440, the SNR may be determined. The SNR may be determined from the BER and a set of BER curves. The UE may store one or more BER curves. In some examples, a decoder has access to the BER curves. A mapping of the SNR from $P_e$ may be $\gamma^*$. In some examples, where the BER per layer was determined, the SNR per layer, $\gamma_l^*$, may be determined.

Method 400 may compute the average spectral efficiency at 445 or the spectral efficiency per transmission layer at 450. At 445, the average SPEF may be calculated as a minimum between a log function of the average SNR (y*) and the maximum modulation order ($Q_{max}$), given as Equation 1:

$$\min(\log_2(1+y^*), Q_{max}) \qquad (1)$$

Since the wireless communication system may have certain constraints with the modulation, there may be a maximum modulation. A base station using the RRC messaging may decide which table will be used, and inform the UE which table is being used. For example, if Table 1 is being used, the maximum modulation is 64QAM, so $Q_{max}$ is 6. If Table 2 is being used, $Q_{max}$ is 8. In other examples, other tables may be indicated.

Alternatively, at 450, the UE may calculate the average SPEF per transmission layer, L, based on the SNR per layer ($\gamma_l^*$), which is given as Equation 2:

$$\frac{\sum_{l \in \{1,\ldots,l\}} \min(\log_2(1+y_l^*), Q_{max})}{L} \qquad (2)$$

In this alternative, the LLRs are all divided per layer and the LLRs of each layer are compared to determine a BER for that layer. Then an estimated SNR is obtained for each layer. The SPEF may then be determined for each layer. In some examples, all of the SPEFs are averaged to determine an average SPEF. That is, all the SPEFs for each layer may be calculated, summed, and then divided by the total number of layers, L. This alternative may yield an improved accuracy than Equation 1 (at 445 in method 400) at the cost of speed and processor power.

Regardless of whether the BER, SNR, and SPEF are determined per layer or not, the SPEF can be used to determine the CQI index from the CQI tables. Because the UE knows which table is being used, method 400 may include using the calculated SPEF to determine the CQI index. For example, if the average SPEF is calculated to be 0.3770 and Table 1 is being used, this means the CQI is index 3. The UE may record or otherwise store the CQI index or a backed-off value of the CQI index to reduce the potential retransmission BLER. For example, if the CQI index is 3, the UE may record and send 3 or even 2 to be more conservative.

Method 400 may also include determining the transmission rank at 460. The transmission rank may be obtained from the SPEF per layer. This information can be used to determine the rank of the channel (i.e., the number of transmission layers to be supported). The UE may feedback the transmission rank to the base station. Alternatively, the number of supported transmission layers may be provided to the base station.

The number of supported layers, or the transmission rank, may be determined by comparing the SPEF for all combinations of layers of the original transmission. Method 400 may compare the SPEF of each combination of transmission layers, and the maximum will reflect the maximum number of layers that could be supported by the wireless channel. Assuming L layers were sent, if the SPEF of any subset of layers $L^\sim \leq L$ is higher than using the rank (e.g., the max number of transmission layers L), the UE may report the new rank to the base station.

For example, if there were four transmission layers in the transmission of the data packet, the average SPEF of each combination of layers (i.e., summing the SPEF of each combination and dividing the sum by the number of layers used in the calculation) would be compared: 1, 2, 3, 4, 1+2, 1+3, 1+4, 2+3, 2+4, 3+4, 1+2+3, 1+2+4, 1+3+4, 2+3+4, 1+2+3+4. Method 400 may create a table for the combinations. Then method 400 may select the maximum. Based on the maximum combined SPEF, method 400 may determine the maximum number of layers that can be supported or that gives the highest SPEF.

As another example, consider three transmission layers. Each transmission layer has a computed SPEF: S1, S2, and S3. Each combination is going to be compared: S1, S2, S3; (S1+S2)/2, (S1+S3)/2, (S2+S3)/2; (S1+S2+S3)/3. The maximum is then determined. If the maximum value is S1, S2, or S3, then the rank is 1 (e.g., the wireless channel supports one layer). If the maximum value is (S1+S2)/2, (S1+S3)/2, or (S2+S3)/2, then the rank is 2. If the maximum value is (S1+S2+S3)/3, then the rank is 3. This method may be extended to other numbers of layers.

At 465, method 400 may include transmitting the feedback message to the wireless transmitting device (e.g., the base station). The feedback message may be a Turbo-HARQ feedback message. The feedback message may include an indication of the CQI index or the transmission rank. In some examples, the feedback message includes both the CQI index and the transmission rank. In some examples, the feedback message indicates the number of transmission layers directly instead of the transmission rank itself. The feedback message may also include an ACK or a NACK.

Method 400 may return to 405 and receive a retransmission of the data packet. At 420, because the base station should have updated one or more transmission parameters based on the Turbo-HARQ feedback message, method 400 may decode the retransmitted data packet without error.

Figure 5:
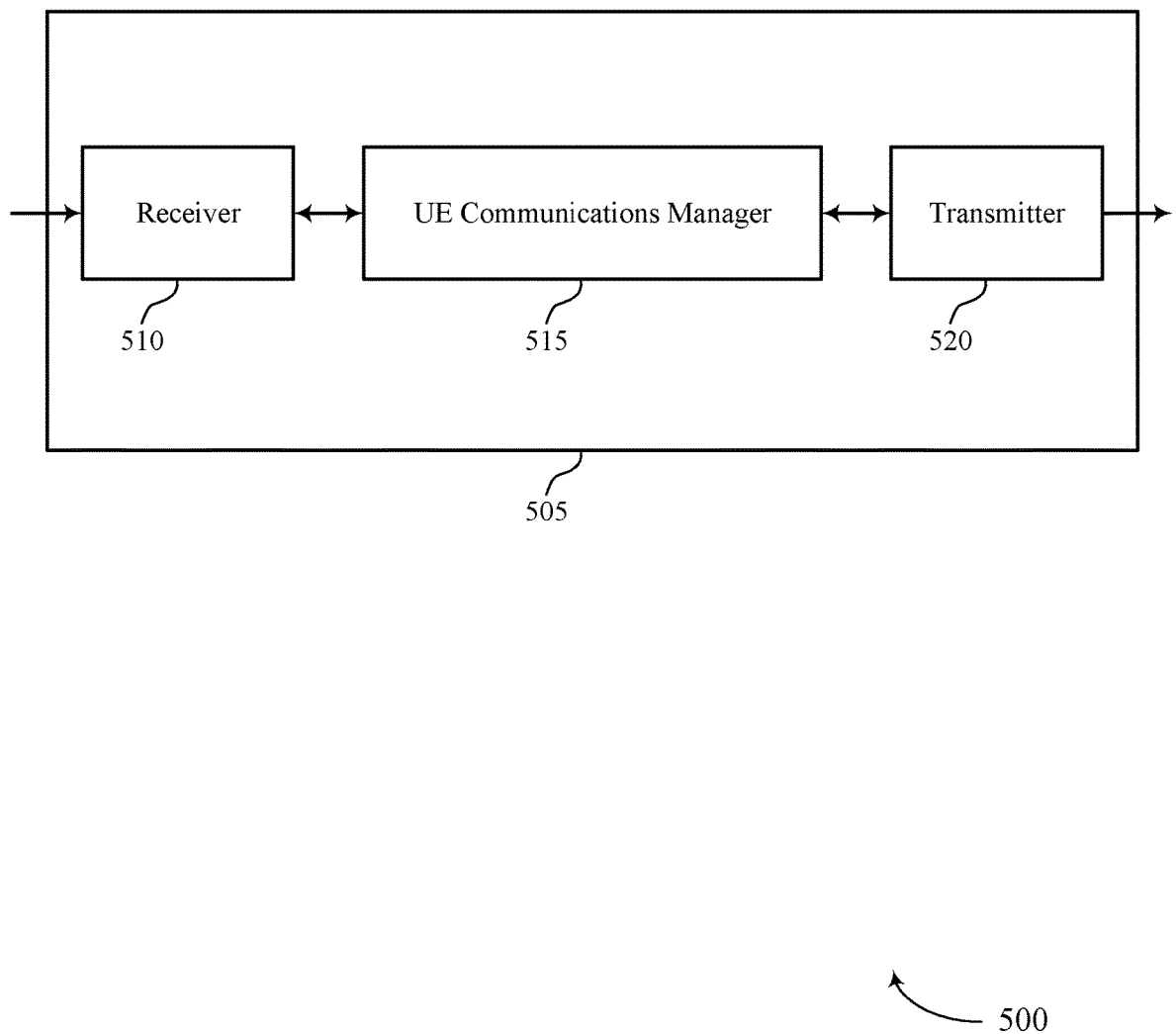
FIG. 5 shows a block diagram of a device that supports LLR-based rate adaptation through Turbo-HARQ in accordance with aspects of the present disclosure.

FIG. 5 shows a block diagram 500 of a device 505 that supports log likelihood ratio based rate adaptation through Turbo-HARQ in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses). The UE communications manager 515 may be an example of one or more aspects of the UE communications manager 160 of FIG. 1.

The receiver 510 may receive information such as packets, user data, or control information associated with various information channels (e.g., control channels, data channels, and information related to log likelihood ratio based rate adaptation through Turbo-HARQ, etc.). Information may be passed on to other components of the device 505. The receiver 510 may be an example of aspects of the transceiver 820 described with reference to FIG. 8. The receiver 510 may utilize a single antenna or a set of antennas. The receiver 510 may receive a data packet transmission over a wireless channel from a base station.

The communications manager 515 may determine a set of intrinsic LLRs based on the data packet transmission. The communications manager 515 may determine an accumulated capacity for the wireless channel based on the set of intrinsic LLRs and determine a channel quality indicator index or a transmission rank for the wireless channel based on the accumulated capacity. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas. The transmitter 520 may transmit a feedback message that indicates the channel quality indicator index or the transmission rank for the wireless channel to the base station.

Figure 6:
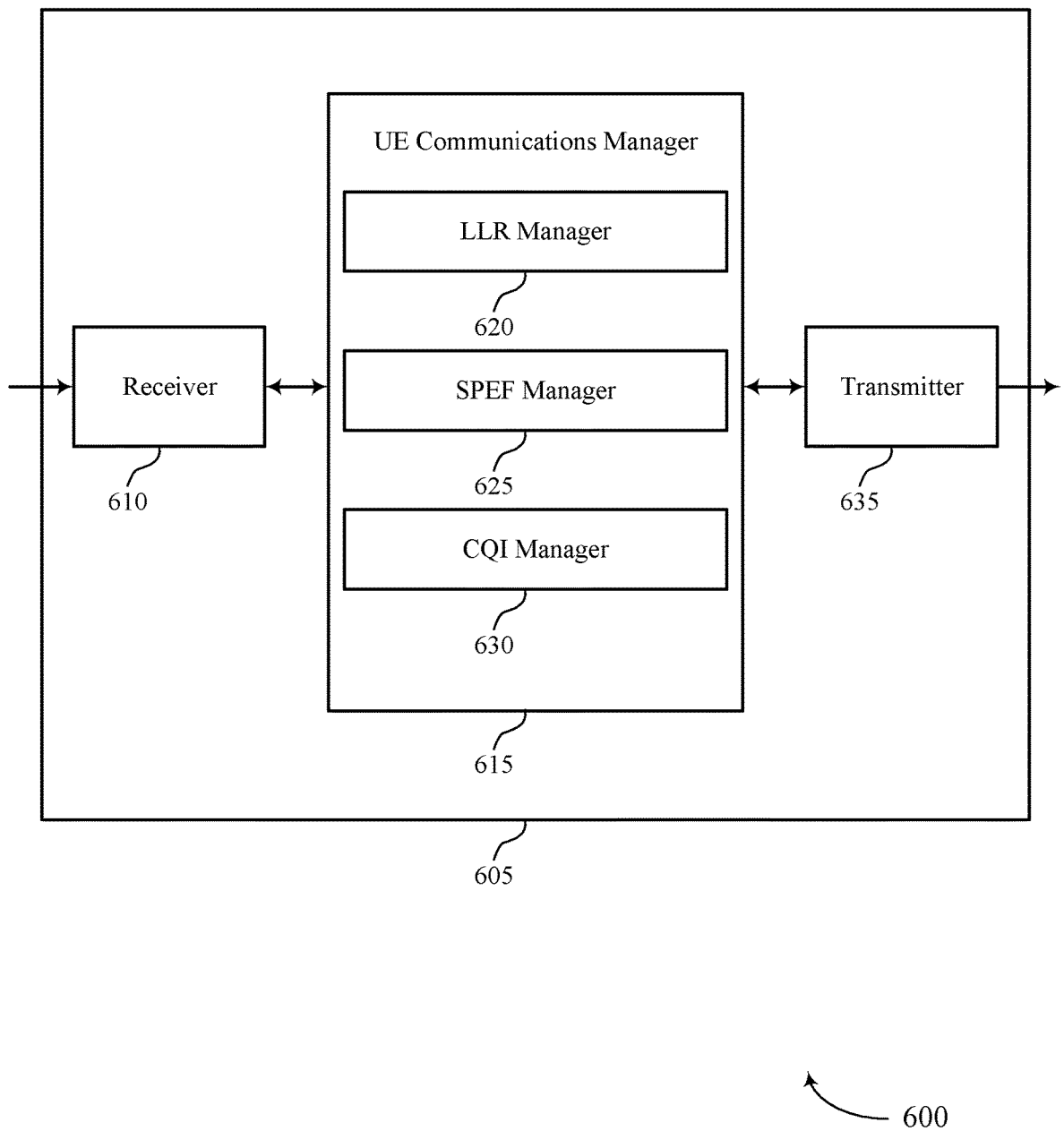
FIG. 6 shows a block diagram of a device that supports LLR-based rate adaptation through Turbo-HARQ in accordance with aspects of the present disclosure.

FIG. 6 shows a block diagram 600 of a device 605 that supports LLR-based rate adaptation through Turbo-HARQ in accordance with aspects of the present disclosure. The device 605 may be an example of aspects of a device 505, or a UE 115 as described herein. The device 605 may include a receiver 610, a UE communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to LLR-based rate adaptation through Turbo-HARQ, etc.). Information may be passed on to other components of the device 605. The receiver 610 may be an example of aspects of the transceiver 820 described with reference to FIG. 8. The receiver 610 may utilize a single antenna or a set of antennas. The receiver 610 may receive a data packet transmission over a wireless channel from a base station.

The UE communications manager 615 may be an example of aspects of the communications manager 515 and 160 as described herein. The communications manager 615 may include an LLR manager 620, a SPEF manager 625, and a CQI manager 630. The UE communications manager 615 may be an example of aspects of the UE communications manager 810 described herein.

The LLR manager 620 may determine a set of LLRs based on the data packet transmission. The LLRs may be input to a decoder. The SPEF manager 625 may determine an accumulated capacity for the wireless channel based on the set of intrinsic LLRs. The SPEF manager 625 may determine the SPEF as an average over all the transmission layers or as an average of each transmission layer.

The CQI manager 630 may determine a CQI index or a transmission rank for the wireless channel based on the accumulated capacity. The CQI manager 630 may determine the CQI index from the SPEF using a CQI table. The CQI manager 630 may determine the transmission rank by comparing the SPEFs of each combination of layers used to transmit the data packet.

The transmitter 640 may transmit signals generated by other components of the device 605. In some examples, the transmitter 640 may be collocated with a receiver 610 in a transceiver manager. For example, the transmitter 640 may be an example of aspects of the transceiver 820 described with reference to FIG. 8. The transmitter 640 may utilize a single antenna or a set of antennas. The transmitter 640 may transmit a feedback message that indicates the channel quality indicator index or the transmission rank for the wireless channel to the base station.

Figure 7:
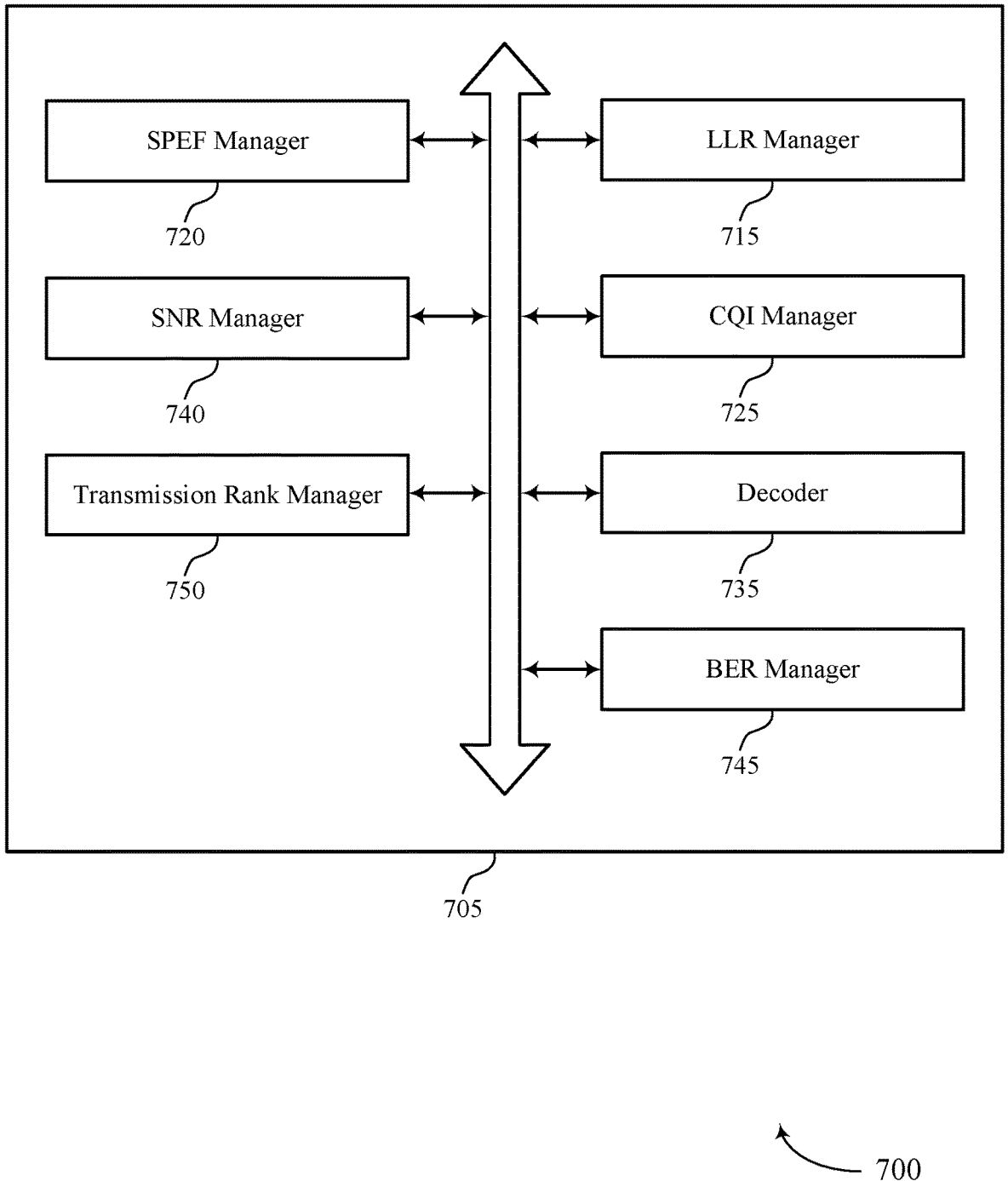
FIG. 7 shows a block diagram of a communications manager that supports LLR-based rate adaptation through Turbo-HARQ in accordance with aspects of the present disclosure.

FIG. 7 shows a block diagram 700 of a UE communications manager 705 that supports LLR-based rate adaptation through Turbo-HARQ in accordance with aspects of the present disclosure. The UE communications manager 705 may be an example of aspects of a UE communications manager 160, 515, 615, or 810 described herein. The UE communications manager 705 may include an LLR manager 715, a SPEF manager 720, a CQI manager 725, a decoder 735, an SNR manager 740, a BER manager 745, and a transmission rank manager 750. Each of these managers may communicate, directly or indirectly, with one another (e.g., via one or more buses).

The LLR manager 715 may determine a set of intrinsic LLRs based on a received data packet transmission. In some examples, the LLR manager 715 may determine a set of decoder output LLRs based on the decoded data packet transmission. In some examples, the LLR manager 715 may compare the set of intrinsic LLRs to the set of decoder output LLRs. In some examples, the LLR manager 715 may differ a bit string of the set of intrinsic LLRs and a bit string of the set of decoder output LLRs.

The decoder 735 may decode the data packet transmission. The LLR manager 715 may input the set of intrinsic LLRs to the decoder 735, which may output the set of decoder output LLRs. In some examples, the decoder 735 may detect at least one decoding error in the decoded data packet transmission, where determining the set of intrinsic LLRs is based on detecting the at least one decoding error.

The BER manager 745 may compute a BER based on the comparison of the set of intrinsic LLRs and the decoder output LLRs, where the SNR is further based on the BER.

The SPEF manager 720 may determine an accumulated capacity for the wireless channel based on the set of intrinsic LLRs. In some examples, the SPEF manager 720 may determine a spectral efficiency of the wireless channel from the SNR, where the accumulated capacity is the spectral efficiency. In some examples, the SPEF manager 720 may compute an average spectral efficiency based on a minimum of a maximum modulation order and a log based on the SNR. In some examples, the SPEF manager 720 may compute an average spectral efficiency based on a sum of a minimum of a log based on the SNR per transmission layer and a maximum modulation order.

The CQI manager 725 may determine a channel quality indicator index or a transmission rank for the wireless channel based on the accumulated capacity. In some examples, the CQI manager 725 may determine the CQI index using the spectral efficiency and a CQI-to-efficiency table.

The SNR manager 740 may determine a SNR for the data packet transmission based on the set of intrinsic LLRs and the set of decoder output LLRs, where determining the accumulated capacity is further based on the SNR. In some examples, the SNR manager 740 may determine the SNR for the data packet is further based on a quadrature amplitude modulation of the data packet transmission. In some examples, the SNR manager 740 may determine the SNR as an SNR per transmission layer of the data packet transmission.

The transmission rank manager 750 may determine the transmission rank of the wireless channel based on a number of transmission layers of the data packet transmission.

The UE communication manager 705 may cause a transmitter to transmit the transmission rank or the CQI index.

Figure 8:
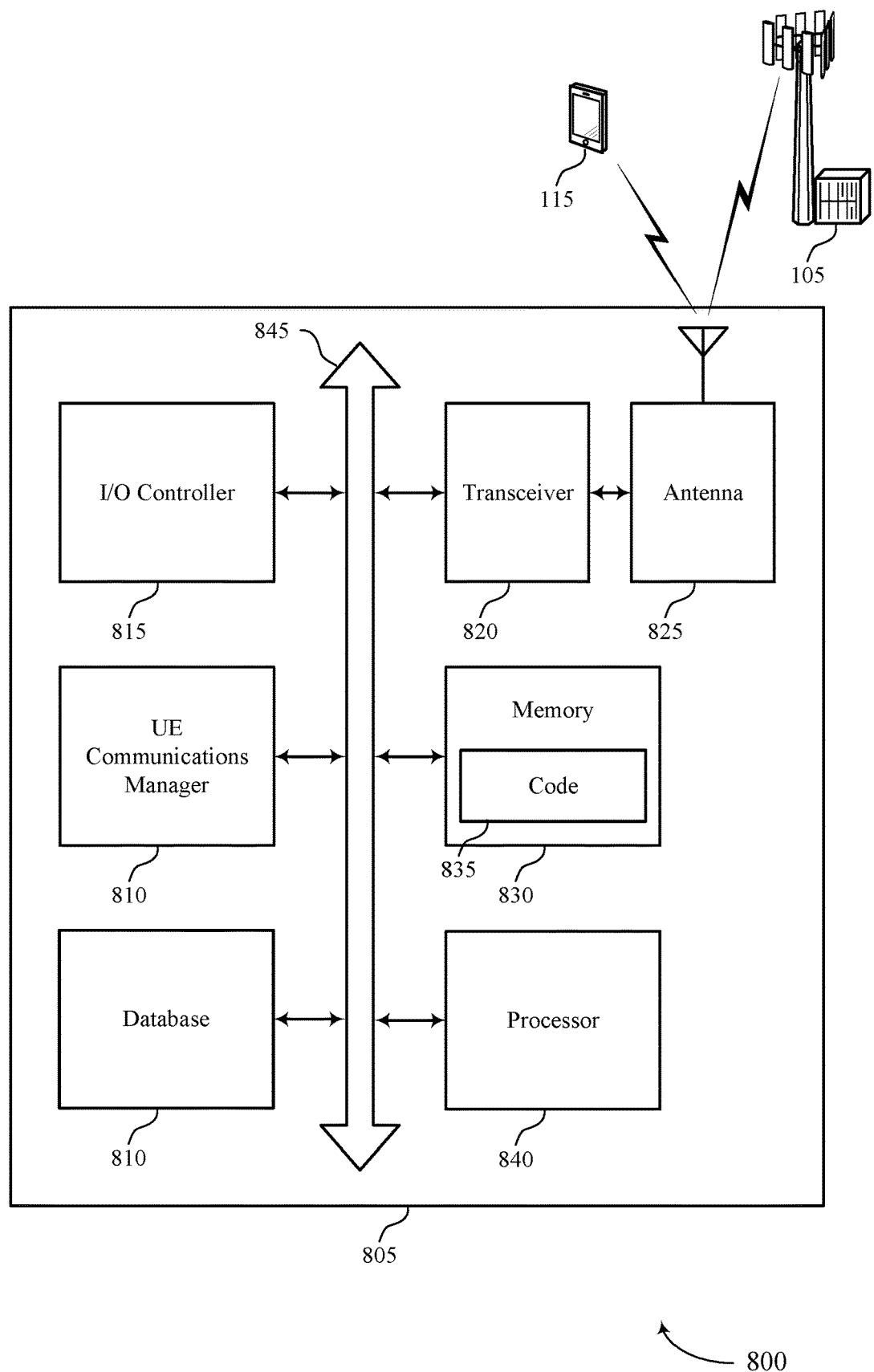
FIG. 8 shows a diagram of a system including a device that supports LLR-based rate adaptation through Turbo-HARQ in accordance with aspects of the present disclosure.

FIG. 8 shows a diagram of a system 800 including a device 805 that supports LLR-based rate adaptation through Turbo-HARQ in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The UE communications manager 810 may receive a data packet transmission over a wireless channel from a base station, determine a set of intrinsic LLRs based on the data packet transmission, determine an accumulated capacity for the wireless channel based on the set of intrinsic LLRs, determine a channel quality indicator index or a transmission rank for the wireless channel based on the accumulated capacity, and transmit a feedback message that indicates the CQI index or the transmission rank for the wireless channel to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825. However, in some cases the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting LLR-based rate adaptation through Turbo-HARQ).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
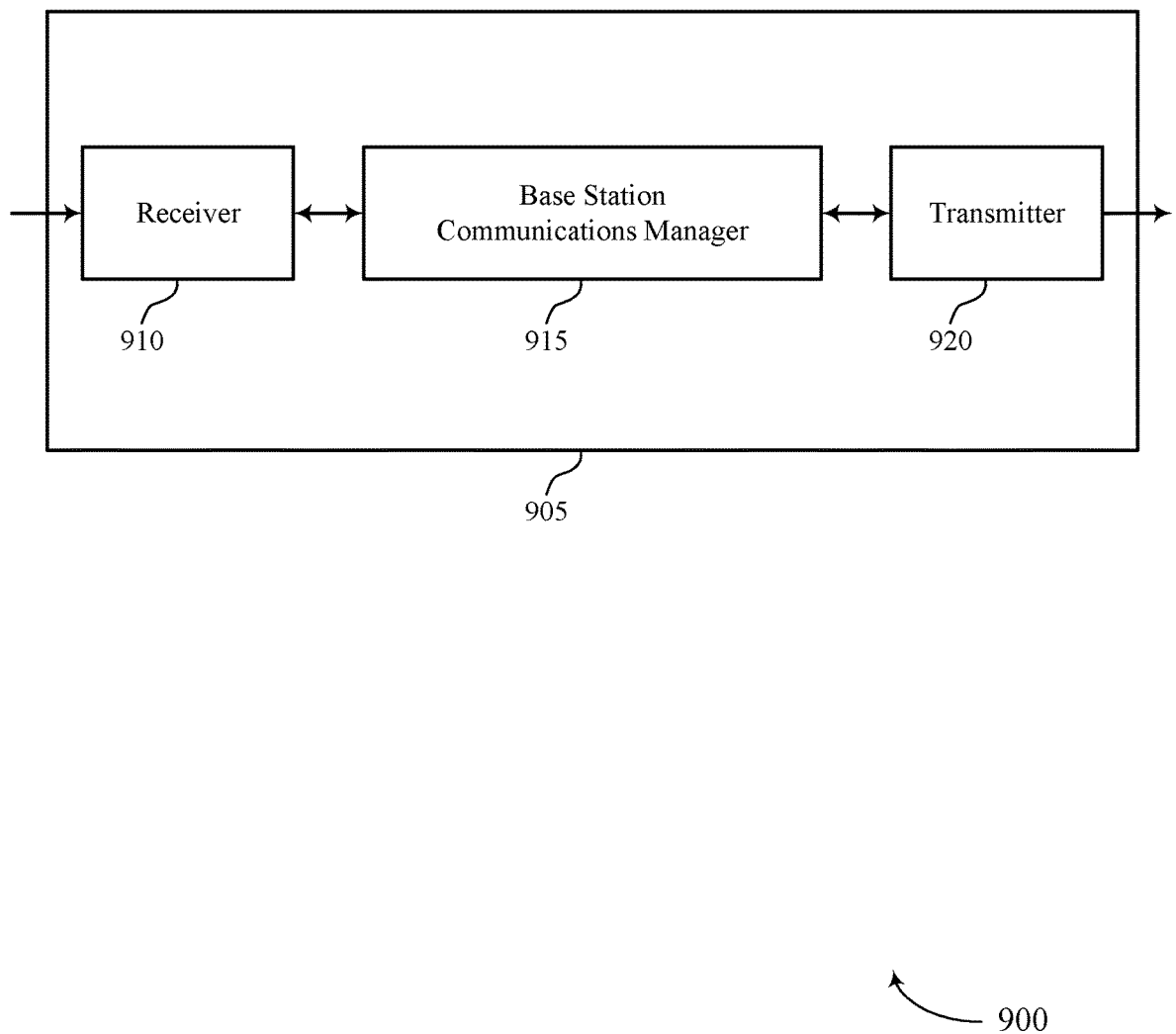
FIG. 9 shows a block diagram of a device that supports LLR-based rate adaptation through Turbo-HARQ in accordance with aspects of the present disclosure.

FIG. 9 shows a block diagram 900 of a device 905 that supports LLR-based rate adaptation through Turbo-HARQ in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses). The base station communications manager 915 may be an example of one or more aspects of the base station communications manager 165.

The receiver 910 may receive information such as packets, user data, or control information associated with various information channels (e.g., control channels, data channels, and information related to LLR-based rate adaptation through Turbo-HARQ, etc.). Information may be passed on to other components of the device 905. The receiver 910 may be an example of aspects of the transceiver 1220 described with reference to FIG. 12. The receiver 910 may utilize a single antenna or a set of antennas. The receiver 910 may receive a feedback message that indicates a channel quality indicator index or a transmission rank for the wireless channel from the UE.

The base station communications manager 915 may interpret the feedback message that indicates a channel quality indicator index or a transmission rank for the wireless channel from the UE. The base station communications manager 915 may update a transmission parameter based on the channel quality indicator index or the transmission rank. The base station communications manager 915 may be an example of aspects of the communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas. The transmitter 920 may transmit a data packet transmission over a wireless channel to a UE. The transmitter 920 may retransmit at least a portion of the data packet transmission over the wireless channel using the updated transmission parameter.

Figure 10:
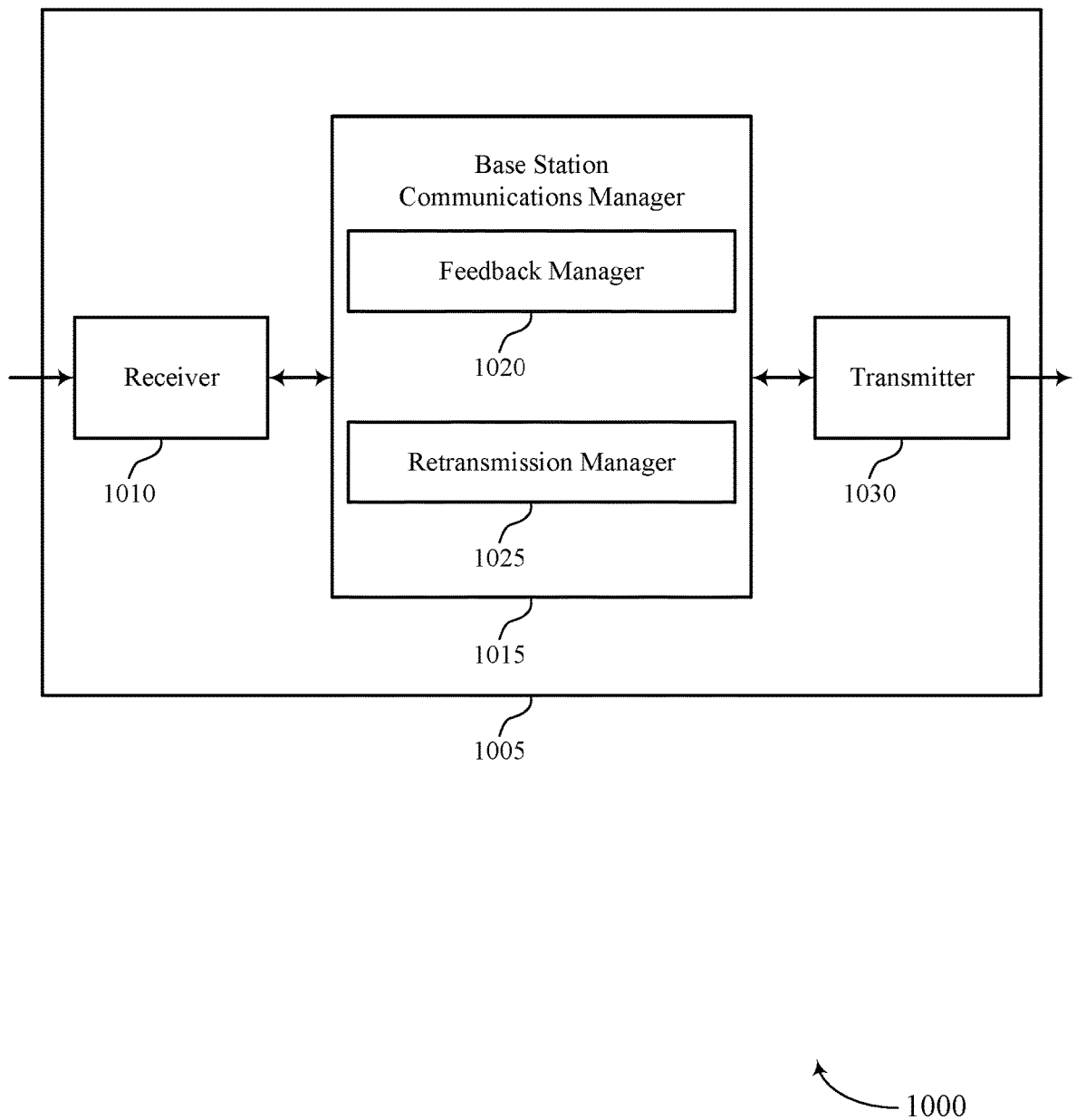
FIG. 10 shows a block diagram of a device that supports LLR-based rate adaptation through Turbo-HARQ in accordance with aspects of the present disclosure.

FIG. 10 shows a block diagram 1000 of a device 1005 that supports log likelihood ratio based rate adaptation through Turbo-HARQ in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to LLR-based rate adaptation through Turbo-HARQ, etc.). Information may be passed on to other components of the device 1005. The receiver 1010 may be an example of aspects of the transceiver 1220 described with reference to FIG. 12. The receiver 1010 may utilize a single antenna or a set of antennas. The receiver 1010 may receive a feedback message that indicates a channel quality indicator index or a transmission rank for the wireless channel from the UE.

The base station communications manager 1015 may be an example of aspects of the base station communications manager 915 as described herein. The base station communications manager 1015 may include a feedback manager 1030 and a retransmission manager 1025. The base station communications manager 1015 may be an example of aspects of the base station communications manager 165, 915, and 1210 described herein.

The feedback manager 1030 may update a transmission parameter based on the channel quality indicator index or the transmission rank. The feedback manager 1030 may update a modulation parameter based on the CQI index. The feedback manager 1030 may update the MCS using the CQI index. In examples where the transmission rank or number of transmission layers was indicated in the feedback message, the feedback manager 1030 may update the number of transmission layers to be used.

The retransmission manager 1020 instructs the transmitter 1035 to retransmit at least a portion of the data packet based on the updated transmission parameters.

The transmitter 1035 may transmit signals generated by other components of the device 1005. In some examples, the transmitter 1035 may be collocated with a receiver 1010 in a transceiver manager. For example, the transmitter 1035 may be an example of aspects of the transceiver 1220 described with reference to FIG. 12. The transmitter 1035 may utilize a single antenna or a set of antennas. The transmitter 1035 may transmit a data packet transmission over a wireless channel to a UE and retransmit at least a portion of the data packet transmission over the wireless channel using the updated transmission parameter.

Figure 11:
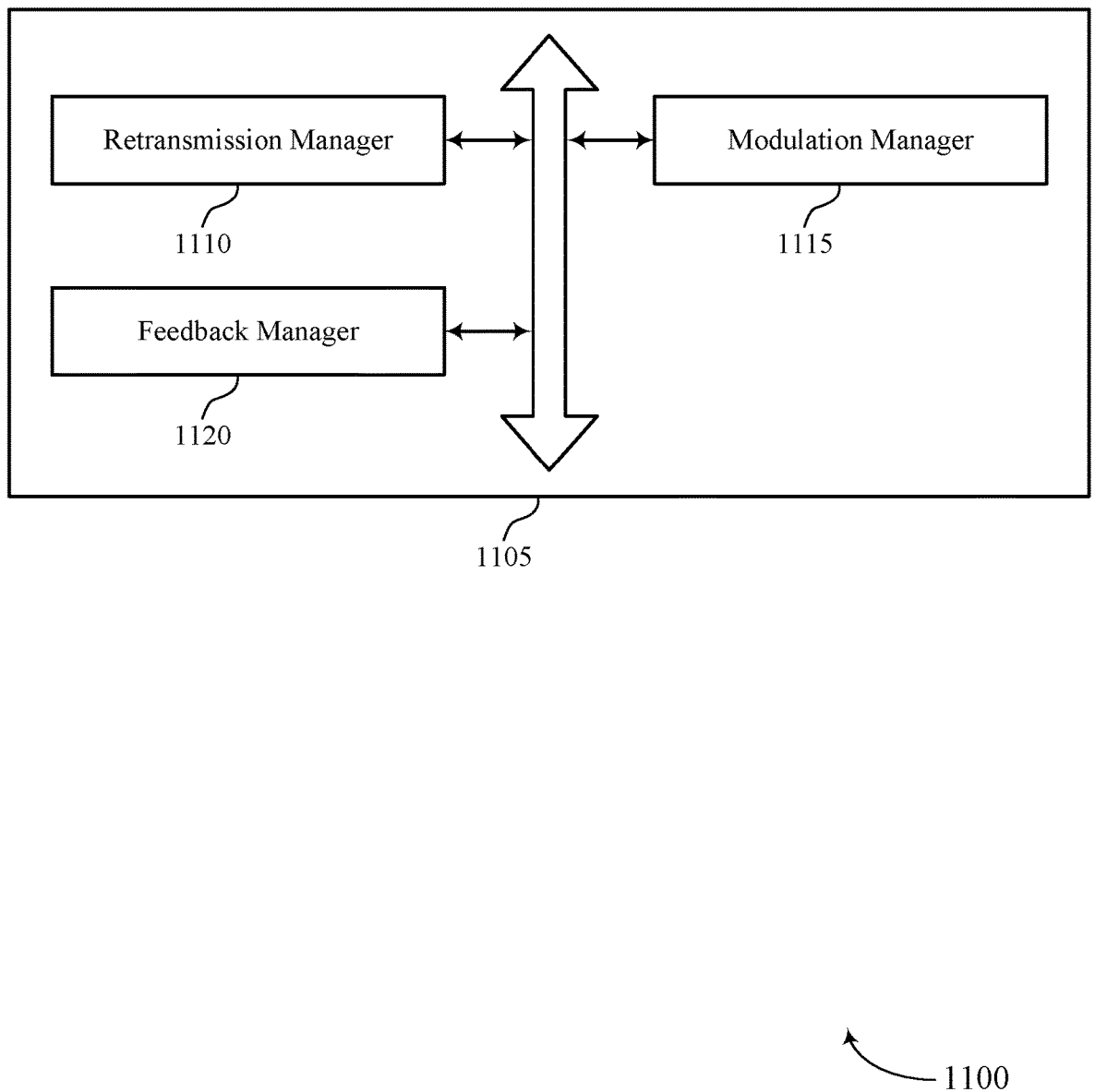
FIG. 11 shows a block diagram of a communications manager that supports LLR-based rate adaptation through Turbo-HARQ in accordance with aspects of the present disclosure.

FIG. 11 shows a block diagram 1100 of a base station communications manager 1105 that supports LLR-based rate adaptation through Turbo-HARQ in accordance with aspects of the present disclosure. The base station communications manager 1105 may be an example of aspects of a communications manager 915, a base station communications manager 1015, or a communications manager 1210 described herein. The base station communications manager 1105 may include a retransmission manager 1110, a modulation manager 1115, and a feedback manager 1120. Each of these managers may communicate, directly or indirectly, with one another (e.g., via one or more buses).

A transmitter of the base station may transmit a data packet transmission over a wireless channel to a UE. A receiver of the base station may receive a feedback message that indicates a channel quality indicator index or a transmission rank for the wireless channel from the UE.

The feedback manager 1120 may update a transmission parameter based on the channel quality indicator index or the transmission rank. In some examples, the feedback manager 1120 may update a modulation and coding scheme based on the channel quality indicator index. In some examples, the feedback manager 1120 may update a coding length for retransmitting the data packet based on the channel quality indicator index or the transmission rank. In some examples, the feedback manager 1120 may update resources used for retransmitting the data packet based on the channel quality indicator index or the transmission rank.

The modulation manager 1115 may update one or more modulation parameters. The retransmission manager 1110 may cause a transmitter of the base station to retransmit at least a portion of the data packet transmission over the wireless channel using the updated transmission parameter.

Figure 12:
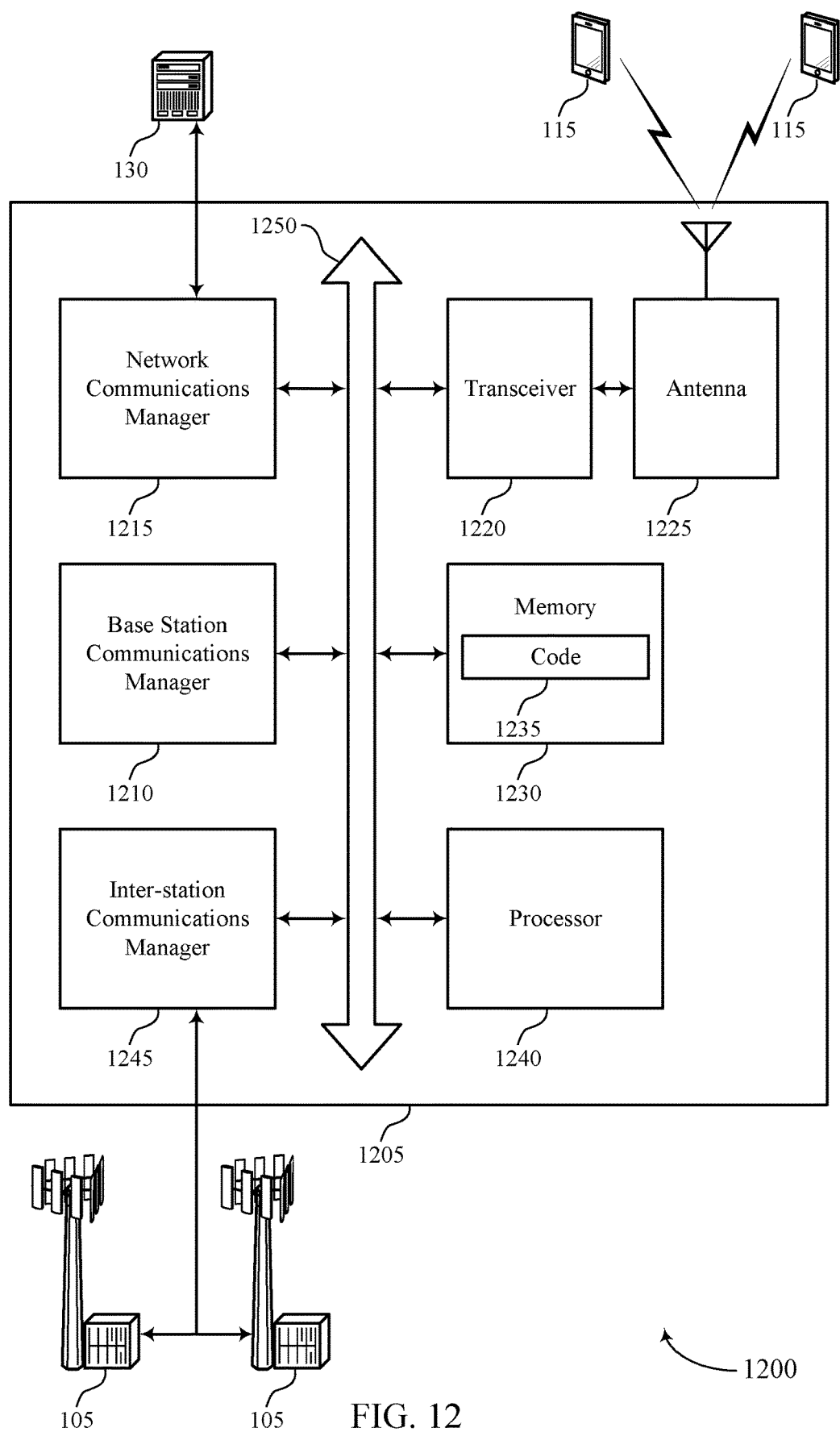
FIG. 12 shows a diagram of a system including a device that supports LLR-based rate adaptation through Turbo-HARQ in accordance with aspects of the present disclosure.

FIG. 12 shows a diagram of a system 1200 including a device 1205 that supports LLR-based rate adaptation through Turbo-HARQ in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit a data packet transmission over a wireless channel to a UE, retransmit at least a portion of the data packet transmission over the wireless channel using the updated transmission parameter, receive a feedback message that indicates a channel quality indicator index or a transmission rank for the wireless channel from the UE, and update a transmission parameter based on the channel quality indicator index or the transmission rank.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting LLR-based rate adaptation through Turbo-HARQ).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
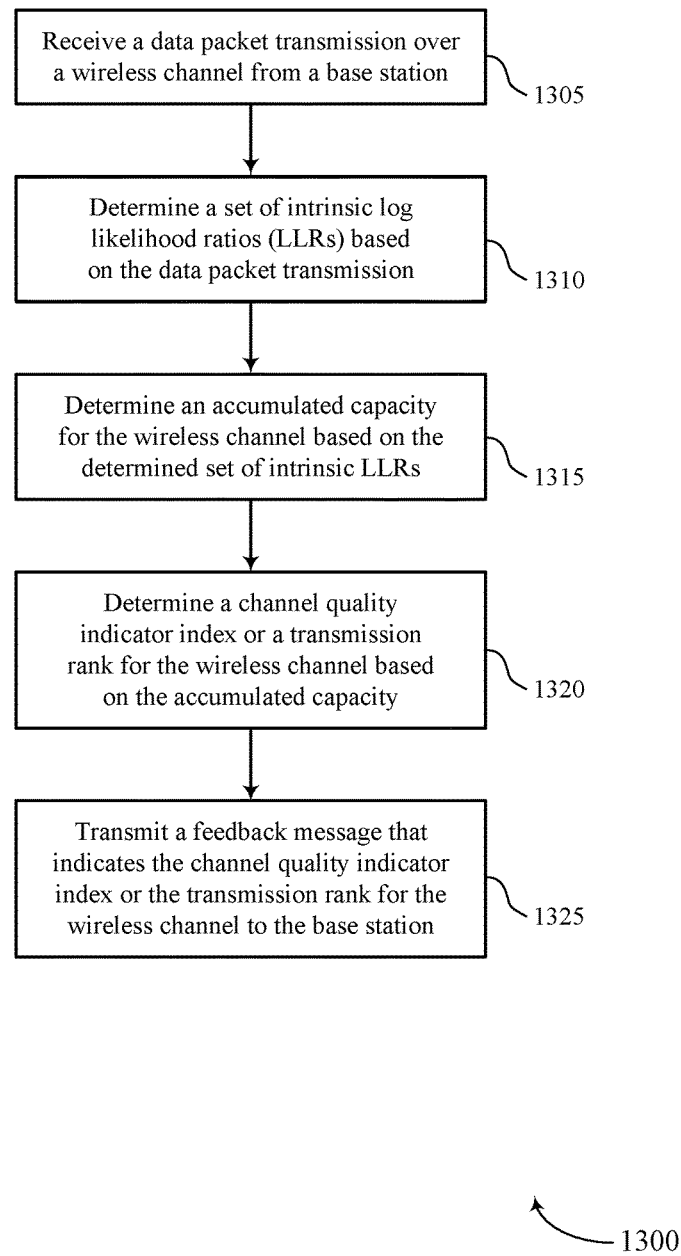
FIGS. 13 through 15 show flowcharts illustrating methods that support LLR-based rate adaptation through Turbo-HARQ in accordance with aspects of the present disclosure.

FIG. 13 shows a flowchart illustrating a method 1300 that supports LLR-based rate adaptation through Turbo-HARQ in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a data packet transmission over a wireless channel from a base station. The operations of 1305 may be performed according to the methods described herein. In some examples, aspects of the operations of 1305 may be performed by a receiver as described with reference to FIGS. 5 through 8.

At 1310, the UE may determine a set of intrinsic LLRs based on the data packet transmission. The operations of 1310 may be performed according to the methods described herein. In some examples, aspects of the operations of 1310 may be performed by a LLR manager as described with reference to FIGS. 5 through 8.

At 1315, the UE may determine an accumulated capacity for the wireless channel based on the set of intrinsic LLRs. The operations of 1315 may be performed according to the methods described herein. In some examples, aspects of the operations of 1315 may be performed by a SPEF manager as described with reference to FIGS. 5 through 8.

At 1320, the UE may determine a channel quality indicator index or a transmission rank for the wireless channel based on the accumulated capacity. The operations of 1320 may be performed according to the methods described herein. In some examples, aspects of the operations of 1320 may be performed by a CQI manager as described with reference to FIGS. 5 through 8.

At 1325, the UE may transmit a feedback message that indicates the channel quality indicator index or the transmission rank for the wireless channel to the base station. The operations of 1325 may be performed according to the methods described herein. In some examples, aspects of the operations of 1325 may be performed by a transmitter as described with reference to FIGS. 5 through 8.

Figure 14:
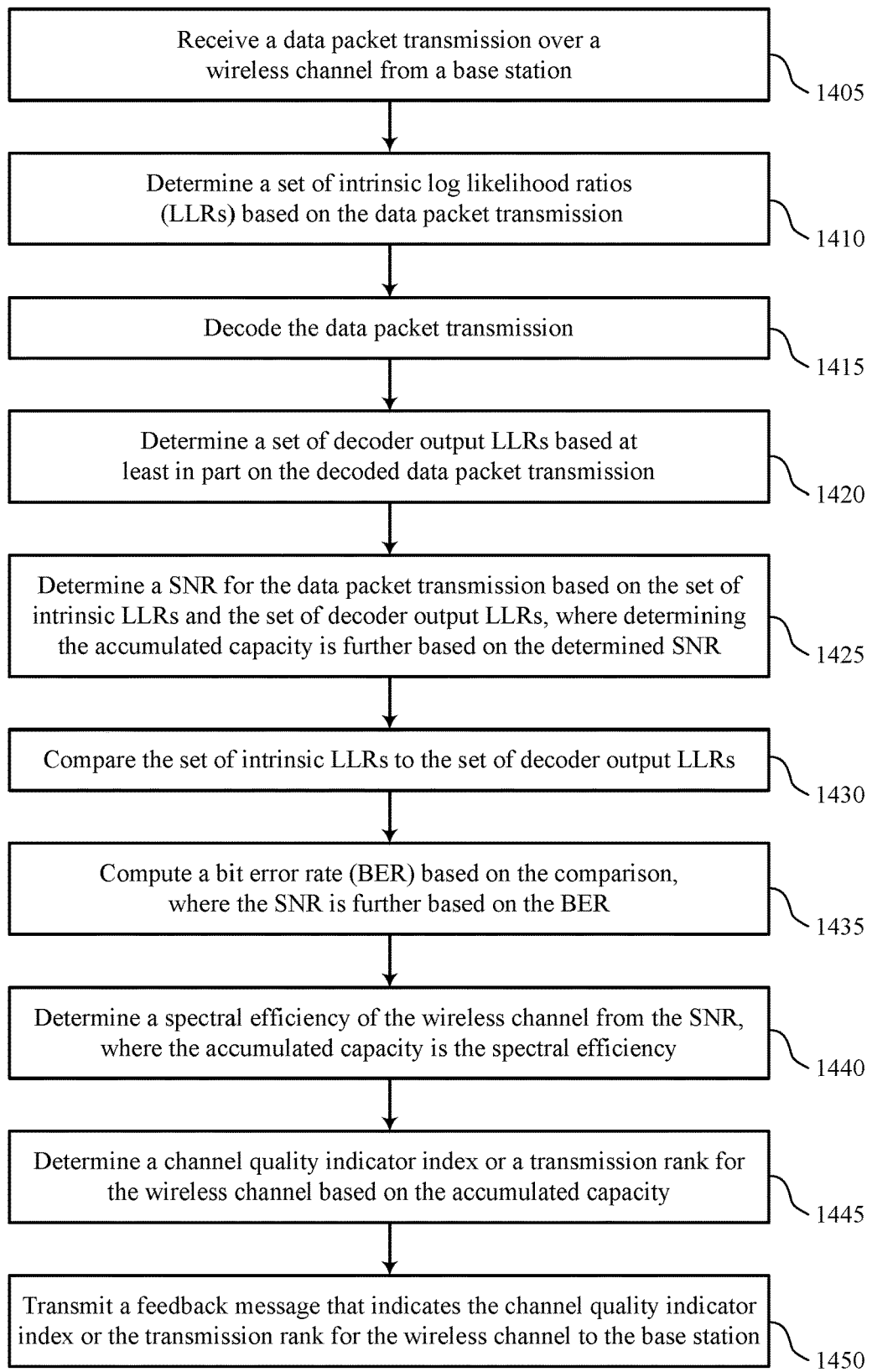

FIG. 14 shows a flowchart illustrating a method 1400 that supports LLR-based rate adaptation through Turbo-HARQ in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a data packet transmission over a wireless channel from a base station. The operations of 1405 may be performed according to the methods described herein. In some examples, aspects of the operations of 1405 may be performed by a receiver as described with reference to FIGS. 5 through 8.

At 1410, the UE may determine a set of intrinsic LLRs based on the data packet transmission. The operations of 1410 may be performed according to the methods described herein. In some examples, aspects of the operations of 1410 may be performed by a LLR manager as described with reference to FIGS. 5 through 8.

At 1430, the UE may decode the data packet transmission. The operations of 1430 may be performed according to the methods described herein. In some examples, aspects of the operations of 1430 may be performed by a decoder as described with reference to FIGS. 5 through 8.

At 1420, the UE may determine a set of decoder output LLRs based on the decoded data packet transmission. The operations of 1420 may be performed according to the methods described herein. In some examples, aspects of the operations of 1420 may be performed by a LLR manager as described with reference to FIGS. 5 through 8.

At 1425, the UE may determine a SNR for the data packet transmission based on the set of intrinsic LLRs and the set of decoder output LLRs, where determining the accumulated capacity is further based on the SNR. The operations of 1425 may be performed according to the methods described herein. In some examples, aspects of the operations of 1425 may be performed by a SNR manager as described with reference to FIGS. 5 through 8.

At 1430, the UE may compare the set of intrinsic LLRs to the set of decoder output LLRs. The operations of 1430 may be performed according to the methods described herein. In some examples, aspects of the operations of 1430 may be performed by a LLR manager as described with reference to FIGS. 5 through 8.

At 1435, the UE may compute a BER based on the comparison, where the SNR is further based on the BER. The operations of 1435 may be performed according to the methods described herein. In some examples, aspects of the operations of 1435 may be performed by a BER manager as described with reference to FIGS. 5 through 8.

At 1440, the UE may determine a spectral efficiency of the wireless channel from the SNR, where the accumulated capacity is the spectral efficiency. The operations of 1440 may be performed according to the methods described herein. In some examples, aspects of the operations of 1440 may be performed by a SPEF manager as described with reference to FIGS. 5 through 8.

At 1445, the UE may determine a channel quality indicator index or a transmission rank for the wireless channel based on the accumulated capacity. The operations of 1445 may be performed according to the methods described herein. In some examples, aspects of the operations of 1445 may be performed by a CQI manager as described with reference to FIGS. 5 through 8.

At 1450, the UE may transmit a feedback message that indicates the channel quality indicator index or the transmission rank for the wireless channel to the base station. The operations of 1450 may be performed according to the methods described herein. In some examples, aspects of the operations of 1450 may be performed by a transmitter as described with reference to FIGS. 5 through 8.

Figure 15:
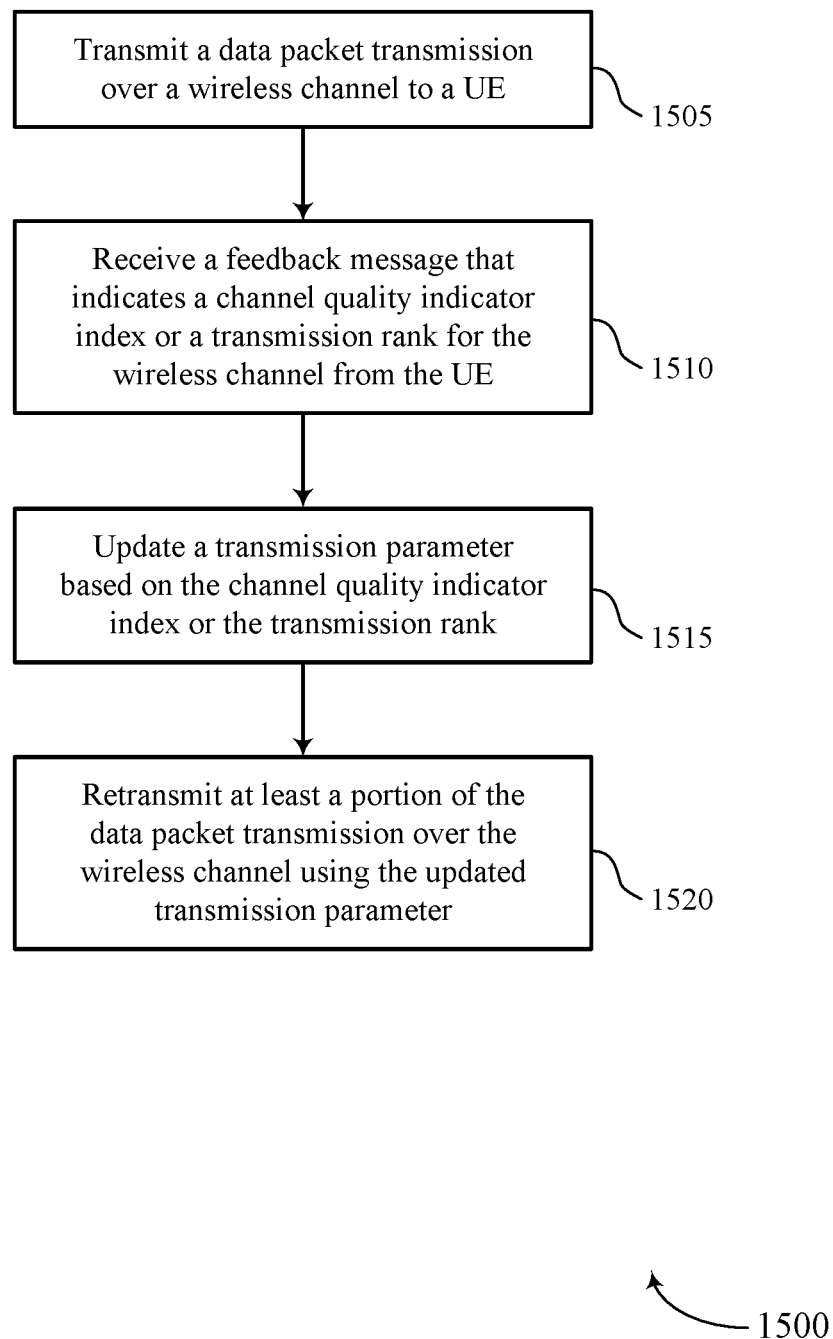

FIG. 15 shows a flowchart illustrating a method 1500 that supports LLR-based rate adaptation through Turbo-HARQ in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a data packet transmission over a wireless channel to a UE. The operations of 1505 may be performed according to the methods described herein. In some examples, aspects of the operations of 1505 may be performed by a transmitter as described with reference to FIGS. 9 through 12.

At 1510, the base station may receive a feedback message that indicates a channel quality indicator index or a transmission rank for the wireless channel from the UE. The operations of 1510 may be performed according to the methods described herein. In some examples, aspects of the operations of 1510 may be performed by a receiver as described with reference to FIGS. 9 through 12.

At 1515, the base station may update a transmission parameter based on the channel quality indicator index or the transmission rank. The operations of 1515 may be performed according to the methods described herein. In some examples, aspects of the operations of 1515 may be performed by a feedback manager as described with reference to FIGS. 9 through 12.

At 1520, the base station may retransmit at least a portion of the data packet transmission over the wireless channel using the updated transmission parameter. The operations of 1520 may be performed according to the methods described herein. In some examples, aspects of the operations of 1520 may be performed by a transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by an apparatus, comprising:
    receiving a data packet transmission over a wireless channel from a network entity;
    determining a set of intrinsic log likelihood ratios (LLRs) based at least in part on the data packet transmission;
    determining an accumulated capacity for the wireless channel based at least in part on the set of intrinsic LLRs;
    determining a channel quality indicator index or a transmission rank for the wireless channel based at least in part on the accumulated capacity; and
    transmitting a feedback message that indicates the channel quality indicator index or the transmission rank for the wireless channel to the network entity.

2. The method of claim 1, further comprising:
    decoding the data packet transmission; and
    determining a set of decoder output LLRs based at least in part on the decoded data packet transmission.

3. The method of claim 2, further comprising:
    determining a signal-to-noise ratio (SNR) for the data packet transmission based at least in part on the set of intrinsic LLRs and the set of decoder output LLRs, wherein determining the accumulated capacity is further based on the SNR.

4. The method of claim 3, wherein determining the SNR further comprises:
    comparing the set of intrinsic LLRs to the set of decoder output LLRs; and
    computing a bit error rate (BER) based at least in part on the comparison, wherein the SNR is further based at least in part on the BER.

5. The method of claim 4, wherein comparing the set of intrinsic LLRs to the set of decoder output LLRs further comprises:
    differing a bit string of the set of intrinsic LLRs and a bit string of the set of decoder output LLRs.

6. The method of claim 3, wherein:
    determining the SNR for the data packet is further based on a quadrature amplitude modulation of the data packet transmission.

7. The method of claim 3, further comprising:
    determining a spectral efficiency of the wireless channel from the SNR, wherein the accumulated capacity is the spectral efficiency.

8. The method of claim 7, wherein determining the spectral efficiency further comprises:
    computing an average spectral efficiency based on a minimum of a maximum modulation order and a log based at least in part on the SNR.

9. The method of claim 7, wherein determining the spectral efficiency further comprises:
    determining the SNR as an SNR per transmission layer of the data packet transmission; and
    computing an average spectral efficiency based on a sum of a minimum of a log based on the SNR per transmission layer and a maximum modulation order.

10. The method of claim 7, wherein determining the channel quality indicator (CQI) index for the wireless channel further comprises:
    determining the CQI index using the spectral efficiency and a CQI-to-efficiency table.

11. The method of claim 1, further comprising:
    decoding the data packet transmission; and
    detecting at least one decoding error in the decoded data packet transmission, wherein determining the set of intrinsic LLRs is based at least in part on detecting the at least one decoding error.

12. A method of wireless communication performed by a network entity, comprising:
    transmitting a data packet transmission over a wireless channel to a user equipment (UE);
    receiving, from the UE, a feedback message that indicates a transmission rank for the wireless channel based at least in part on an accumulated capacity of the wireless channel;
    updating a transmission parameter based on the transmission rank; and retransmitting at least a portion of the data packet transmission over the wireless channel using the updated transmission parameter.

13. The method of claim 12, wherein the feedback message further indicates a channel quality indicator index, wherein updating the transmission parameter further comprises:
updating a modulation and coding scheme based on the channel quality indicator index.

14. The method of claim 12, wherein updating the transmission parameter further comprises:
updating a coding length for retransmitting the data packet based at least in part on the transmission rank.

15. The method of claim 12, wherein updating the transmission parameter further comprises:
updating resources used for retransmitting the data packet based at least in part on the transmission rank.

16. An apparatus for wireless communication, comprising:
a processor,
memory coupled with the processor; and
instructions stored in the memory and executable by the processor to cause the apparatus to:
receive a data packet transmission over a wireless channel from a network entity;
determine a set of intrinsic log likelihood ratios (LLRs) based at least in part on the data packet transmission;
determine an accumulated capacity for the wireless channel based at least in part on the set of intrinsic LLRs;
determine a channel quality indicator index or a transmission rank for the wireless channel based at least in part on the accumulated capacity; and
transmit a feedback message that indicates the channel quality indicator index or the transmission rank for the wireless channel to the network entity.

17. The apparatus of claim 16, wherein the instructions are further executable by the processor to cause the apparatus to:
decode the data packet transmission; and
determine a set of decoder output LLRs based at least in part on the decoded data packet transmission.

18. The apparatus of claim 17, wherein the instructions are further executable by the processor to cause the apparatus to:
determine a signal-to-noise ratio (SNR) for the data packet transmission based at least in part on the set of intrinsic LLRs and the set of decoder output LLRs, wherein determining the accumulated capacity is further based on the SNR.

19. The apparatus of claim 18, wherein the instructions to determine the SNR further are executable by the processor to cause the apparatus to:
compare the set of intrinsic LLRs to the set of decoder output LLRs; and
compute a bit error rate (BER) based at least in part on the comparison, wherein the SNR is further based at least in part on the BER.

20. The apparatus of claim 19, wherein the instructions to compare the set of intrinsic LLRs to the set of decoder output LLRs further are executable by the processor to cause the apparatus to:
differ a bit string of the set of intrinsic LLRs and a bit string of the set of decoder output LLRs.

21. The apparatus of claim 18, wherein determining the SNR for the data packet is further based on a quadrature amplitude modulation of the data packet transmission.

22. The apparatus of claim 18, wherein the instructions are further executable by the processor to cause the apparatus to:
determine a spectral efficiency of the wireless channel from the SNR, wherein the accumulated capacity is the spectral efficiency.

23. The apparatus of claim 22, wherein the instructions to determine the spectral efficiency further are executable by the processor to cause the apparatus to:
compute an average spectral efficiency based on a minimum of a maximum modulation order and a log based at least in part on the SNR.

24. The apparatus of claim 22, wherein the instructions to determine the spectral efficiency further are executable by the processor to cause the apparatus to:
determine the SNR as an SNR per transmission layer of the data packet transmission; and
compute an average spectral efficiency based on a sum of a minimum of a log based on the SNR per transmission layer and a maximum modulation order.

25. The apparatus of claim 22, wherein the instructions to determine the channel quality indicator (CQI) index for the wireless channel further are executable by the processor to cause the apparatus to:
determine the CQI index using the spectral efficiency and a CQI-to-efficiency table.

26. The apparatus of claim 16, wherein the instructions are further executable by the processor to cause the apparatus to:
decode the data packet transmission; and
detect at least one decoding error in the decoded data packet transmission, wherein determining the set of intrinsic LLRs is based at least in part on detecting the at least one decoding error.

27. A network entity for wireless communication, comprising:
a processor,
memory coupled with the processor; and
instructions stored in the memory and executable by the processor to cause the network entity to:
transmit a data packet transmission over a wireless channel to a user equipment (UE);
receive, from the UE, a feedback message that indicates a transmission rank for the wireless channel based at least in part on an accumulated capacity of the wireless channel;
update a transmission parameter based on the transmission rank; and
retransmit at least a portion of the data packet transmission over the wireless channel using the updated transmission parameter.

28. The network entity of claim 27, wherein the feedback message further indicates a channel quality indicator index, and wherein the instructions to update the transmission parameter further are executable by the processor to cause the network entity to:
update a modulation and coding scheme based on the channel quality indicator index.

29. The network entity of claim 27, wherein the instructions to update the transmission parameter further are executable by the processor to cause the network entity to:
update a coding length for retransmitting the data packet based at least in part on the transmission rank.

30. The network entity of claim 27, wherein the instructions to update the transmission parameter further are executable by the processor to cause the network entity to:

update resources used for retransmitting the data packet based at least in part on the transmission rank.

* * * * *